(12) United States Patent
Lokowandt et al.

(10) Patent No.: US 11,243,760 B2
(45) Date of Patent: Feb. 8, 2022

(54) AUTOMATED GENERATION AND CONSISTENCY CHECKING OF SOFTWARE OBJECTS

(71) Applicant: SAP SE, Walldorf (DE)

(72) Inventors: Bernhard Lokowandt, Heidelberg (DE); Stephan Kohlhoff, Darmstadt (DE); Jochen Steinbach, Bad Schoenborn (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 16/521,161

(22) Filed: Jul. 24, 2019

(65) Prior Publication Data

US 2021/0026622 A1 Jan. 28, 2021

(51) Int. Cl.
*G06F 8/70* (2018.01)
*G06F 11/36* (2006.01)

(52) U.S. Cl.
CPC .......... *G06F 8/70* (2013.01); *G06F 11/3612* (2013.01); *G06F 11/3688* (2013.01); *G06F 11/3692* (2013.01)

(58) Field of Classification Search
CPC .... G06F 8/70; G06F 11/3612; G06F 11/3688; G06F 11/3692
See application file for complete search history.

(56) References Cited

U.S. PATENT DOCUMENTS

| | | | |
|---|---|---|---|
| 7,904,406 B2* | 3/2011 | Kumbi | G06F 21/64 706/47 |
| 8,522,203 B1* | 8/2013 | Tibbett | G06F 8/34 717/115 |
| 8,997,091 B1* | 3/2015 | Watson | G06F 8/60 717/175 |
| 9,766,882 B2* | 9/2017 | Kronmueller | G06F 9/4494 |
| 2001/0047279 A1* | 11/2001 | Gargone | G06Q 10/067 705/342 |

(Continued)

OTHER PUBLICATIONS

Liu et al., "Identification and check of inconsistencies between UML diagrams" published by 2013 International Conference on Computer Sciences and Applications, IEEE Computer Society, pp. 487-490 (Year: 2013).*

(Continued)

*Primary Examiner* — S. Sough
*Assistant Examiner* — Zheng Wei
(74) *Attorney, Agent, or Firm* — Klarquist Sparkman, LLP

(57) ABSTRACT

Technologies are described for creating activity object instances corresponding to collection object instances, and for conducting tests between activity object instances and collection objects instances, and within a set of activity object instances. Tests can include determining whether collection object instances have counterpart activity object instances, and evaluating a collection object instance with respect to a corresponding activity object instance. Activity object instances can be set to be performed in a sequence, and a test can determine whether the sequence is consistent with sequencing rules. When activity object instances are automatically created from collection object instances, a user can be presented with a graphical user interface that includes representations of activity object instances, and the user can manipulate the graphical user interface to provide precedence information.

20 Claims, 22 Drawing Sheets

(56) References Cited

U.S. PATENT DOCUMENTS

| | | | |
|---|---|---|---|
| 2005/0144527 A1* | 6/2005 | Haas | G06Q 10/00 |
| | | | 714/38.1 |
| 2011/0060729 A1* | 3/2011 | Marquez | G06F 9/544 |
| | | | 707/690 |
| 2018/0217822 A1* | 8/2018 | Kesler | G06F 8/4434 |

OTHER PUBLICATIONS

Bouajjani et al., "On Verifying Causal Consistency", published by POPL'17, Jan. 15-21, 2017, Paris, France, ACM, pp. 626-638 (Year: 2017).*

* cited by examiner

```
                                                    ┌─ 900
                                                    ▼

Report "MPE_CHECK_MODEL_UNIT"

Select-Options: Model, Unit.

Start-of-selection:
        Issues = CheckModelUnit(model, unit).
        DisplayIssues(Issues).

CheckModelUnit(model, unit)
         ┌─ * Read parameter effectivity. Note that there can be multiple entries in the table for the same model and unit.
         │  Lt_tecs = select * from ModelUnitTable where Material in model and SerialNumber in unit.
906 ─────┤  If not found.
         │          Issues = CollectIssue( _ , "Parameter effectivity does not exist"(1), 1).
         └─         Exit.

┌─ * read networks with given parameter effectivity
         │  Lt_networks = select * from NetworkTable
         │          for all entries in lt_tecs where ModelUnitID = lt_tecs-ModelUnitID.
908 ─────┤  If not found.
         │  Issues = Issues + CollectIssue( _, "Networks do not yet exist"(2), 1).
         └─         Exit.

┌─ * Perform authority checks
         │  For every network in lt_networks.
         │          Authorized = checkAuthority(network).
         │          If not Authorized.
910 ─────┤                  Delete network from lt_networks.
         │  If lt_networks is empty.
         └─         Raise error "You are not authorized for the selected networks".

┌─ * Check if different model-units have been used for every project
         │  Issues = Issues + ProjectHasUniqueParamEffectivity(lt_networks).
         │
         │  * Check if all networks of a project use the same model-unit effectivity
         │  Issues = Issues + ProjectHasSameParameterEffectivity(lt_networks)
         │
         │  * read BOMs assigned to selected networks
914 ─────┤  Lt_boms = select * from BOMNetworkRelationshipTable
         │          For all entries in lt_networks where NetworkID = lt_networks~NetworkID.
         │  If not found.
         │  Issues = Issues + CollectIssue( _, "BOMs not exploded for networks"(3), 2).
         │
         │  * Check BOM version
         │  Issues = Issues + IsBomVersionUpToDate(lt_boms, lt_networks).
         │  Issues = Issues + IsBomVersionReleased(lt_boms).
         └─ Issues = Issues + IsParamEffectivityConsistent(lt_boms, lt_networks).
```

FIG. 9A

```
                  ┌  * read network activities                    ╭─900
                  │  Lt_activities = select * from NetworkActivityTable
                  │        For all entries in lt_networks
          912─────┤  where NetworkID = lt_networks~NetworkID.
                  │  If not found.
                  │        Issues = Issues + CollectIssue( _, "Networks do not have activities"(4), 1).
                  └

┌  * Check activity status
                  │  Issues = Issues + IsActivityReleased(lt_activities).
                  │
                  │  * read components
                  │  Lt_components = select * from ComponentDemandTable
                  │        For all entries in lt_networks
                  │  where NetworkID = lt_networks~NetworkID.
                  │
                  │  * Check if components are planned using Make-to-Project
                  │  Issues = Issues + IsComponentMTP(lt_components).
                  │
                  │  * Check if all components of a major assembly are installation kits
                  │  Issues = Issues + HasInstallationKitsOnly(lt_components).
                  │
          914─────┤  * Check if activity has components
                  │  Issues = Issues + HasActivityComponents(lt_activities, lt_components).
                  │        Issues = Issues + HasComponentActivity(lt_components, lt_activities).
                  │        Issues = Issues + IsBomComplete(lt_boms, lt_components, lt_activities).
                  │
                  │  * Check activity duration
                  │  Issues = Issues + IsActivityDurationConsistent(lt_activities, lt_components).
                  │
                  │  * Check if activities are scheduled as defined by precedence relationships
                  │  Issues = Issues + IsNetworkScheduledCorrectly(lt_activities).
                  │
                  │  * Check if networks of nested major assemblies are connected with precedence relationships
                  │  Issues = Issues + AreNestedMajorAssembliesConnected(lt_boms, lt_activities, lt_networks, lt_components).
                  │
                  │  * Check if different activities have the same reference point
                  └  Issues = Issues + HaveActivitiesSameRefPoint(lt_activities).

Return Issues.
                  916─╯
```

FIG. 9B

```
* Method "ProjectHasUniqueParamEffectivity"
* Model-Unit effectivity assumes that every finished item is produced using a different unit-number.
* If the same unit number is used for different projects producing different end item instances, then BOM
* explosion works, but not as expected. It potentially selects the wrong components. Valid-from-unit and
* valid-to-unit in BOM and routing do not relate to n'th unit produced. A warning shall be raised if the same
* model-unit is reused for different projects. The problem can be fixed by changing the model-unit of the
* network
ProjectHasUniqueParamEffectivity(it_networks).
        If filter-ProjectHasUniqueParamEffectivity = false.
                Exit.
        Sort it_networks by ModelUnit Project.
        For every network in It_networks.
                If lv_ModelUnitID <> network-ModelUnitID.
                        Lv_ModelUnitID = network-ModelUnitID.
                        Lv_ProjectID = network-ProjectID.
                If network-ProjectID <> lv_ProjectID
                And network-ModelUnitID = lv_ModelUnitID.
                        Issues + Issues + CollectIssue(network-ProjectID, "The same parameter effectivity value is
                                used in different projects potentially making different end-items"(6), 3).

* Method "ProjectHasSameParamEffectivity"
* A project can have several activity networks for example for different major assemblies of the same end-item.
* Model-Unit effectivity assumes that every finished item is produced using a different unit-number. It also
* requires that all major assemblies of the same end-item are using the same model and unit. Model and unit
* drive BOM explosion and define for example optional components selected by the customer. Left and right wing
* of an aircraft could be different major assemblies, the assembly of which is controlled by different projects.
* Left and right wing of the same aircraft must be symmetrical. Both are intended for the same aircraft, which
* will be shipped to the same customer. Both must have the same options. Therefore, both projects have to have
* the same model and unit. The problem can be fixed by changing the model-unit of the network.
ProjectHasSameParamEffectivity(it_networks).
        If filter-ProjectHasSameParamEffectivity = false.
                Exit.
        Sort It_networks by ProjectID.
        For every network in It_networks.
                If lv_ProjectID <> network-ProjectID.
                        Lv_ProjectID = network-ProjectID.
```

```
* Method "IsBomVersionUpToDate"
* BOM version should be the latest
* The only possible fix to this issue is re-exploding the BOM
IsBomVersionUpToDate(it_boms, it_networks).
        If filter-IsBomVersionUpToDate = false.
                Exit.
        * first read all BOMs with higher BOM version
        Lt_latest_boms = select * from BOMTable
                For all entries in it_boms
        where BOMId = it_boms-BOMId
        and BOMVersion > it_boms-BOMVersion
        and BOMVersionStatus = 'Released'.
    * Then check if the new BOM version can be used for network
        For every network in it_networks.
                CurrentBom = read it_boms with key NetworkID = network-NetworkID.
                For every LatestBom in Lt_latest_boms where BOMId = CurrentBom-BOMId.
                        If It_latest_boms-BOMVersion < CurrentBom-BOMVersion.
                                Continue.
                        * A new BOM version for a different model and unit does not impact the current project.
                        * If however there is a new BOM version for the model and unit of the current project, then the
                        * current project should adopt the new BOM version. Method GetEffectivityForBom determines
                        * and Model-Unit combinations, for which the BOM is valid.
                        Lt_ModelUnit = GetEffectivityForBom(LatestBom).
                If network-ModelUnit in It_ModelUnit.
                        Issues = Issues + CollectIssue(CurrentBom-ProjectID,"BOM version is not latest"(7), 2).
```

\* Method "IsBomVersionReleased"
\* BOM version should be released
\* Fix to this problem is releasing the BOM version, but only after fixing other issues
IsBomVersionReleased(it_boms).
    If filter-IsBomVersionReleased = false.
        Exit.
    Lt_boms = select VersionStatus from BOMTable
        For all entries in it_boms
    Where BOMId = it_boms-BOMId
    And    BOMVersion = it_boms-BOMVersion.
    For every BOM in lt_boms.
        If BOM-VersionStatus <> "Released".
        Issues = Issues + CollectIssue(BOM-BOMId,"BOM version is not released"(8), 99).
    Return Issues.

\* Method "IsActivityReleased"
\* In the end network activities must be released. We raise an issue if an activity is not released.
\* To fix the issue the production engineer should release the network activity, but only after fixing
\* other issues and releasing the BOM version (or else the production engineer can no longer
\* correct the network activity. The last number in the call to method "CollectIssue" is a kind of
\* sequence number. Issues shall be processed in the sequence of this number. This issue has a high
\* sequence number indicating that it shall be fixed after all other issues with lower sequence numbers.
IsActivityReleased(it_activities).
    If filter-IsActivityReleased = false.
        Exit.
    For every activity in it_activities.
        If activity-isReleased = false.
            Issues = Issues + CollectIssue(activity-ActivityID, _ , "activity not released"(9), 100).
    Return Issues.

\* Method "IsParamEffectivityConsistent"
\* Check ModelUnit in network and BOM.
\* It is always possible to change model and unit in a network. This could indicate the intention to ship
\* a half-completed product to a different customer than originally planned. This invalidates
\* earlier BOM explosions (The new customer could select different product options). To fix the issue
\* you must re-explode the BOM or revers the model / unit of the network.
IsParamEffectivityConsistent(it_boms, it_networks).
    If filter-IsParamEffectivityConsistent = false.
        Exit.
    Sort it_boms by NetworkID.
    For every network in it_networks.
        BOM = Read it_boms with key NetworkID = network-NetworkID.
        If BOM-ModelUnit <> network-ModelUnit.
            Issues = Issues + CollectIssue(network-NetworkID, *"inconsistent parameter effectivity"*(10), 3).
    Return Issues.

```
* Method "IsComponentMTP"
* Every installation kit must be planned in a make-to-project planning section. To fix this issue make sure        930
* the installation kit's "individual/collective requirements" indicator is set to 'individual requirements' and the
* project is using non-valuated project stock.
IsComponentMTP(it_ComponentDemand).
        If filter-IsComponentMTP = false.
                Exit.
    For every ComponentDemand in it_ComponentDemand.
        If ComponentDemand-ProjectID is initial.
                Issues = Issues + CollectIssues(ComponentDemand-NetworkID, "Network demand
                                            (reservation) not in make-to-project planning section"(21), 3)
```

FIG. 9H

```
* Method "HasInstallationKitsOnly"
* BOMs of major assemblies may only contain materials with material type "installation kit"
HasInstallationKitsOnly(it_ComponentDemand).
        If filter-HasInstallationKitsOnly = false.
                                                                              932
                Exit.
        Lt_MaterialTypes = select * from MaterialTable
        For all entries in it_ComponentDemand
        Where MaterialID = it_ComponentDemand~MaterialID.
        Sort Lt_MaterialTypes by MaterialID.
        For every comp in it_ComponentDemand.
                MaterialType = Read Lt_MaterialTypes with key it_ComponentDemand-MaterialID binary search.
                If MaterialType-Type <> InstallationKit
                        Issues = Issues + CollectIssue(network, "Major assembly has component,
                        which is not an Installation kit" (26), X , 3).
```

FIG. 9I

```
* Method "HasActivityComponents"
* Every activity with reference point must have components assigned. The only point of reference points is the
* define at which activity components are needed.
* To solve the problem the production engineer can either delete the network activity            934
* or put the network activity's reference point into a BOM item and subsequently re-explode.
* From this issue a drilldown should be possible into the network, the BOM, and explosion
HasActivityComponents(it_activities, it_components).
        If filter-HasActivityComponents = false.
                Exit.
        Sort it_components by ActivityID.
        For every activity in it_activities where ReferencePoint is not initial.
                Component = Read it_components with key ActivityID = activity-ActivityID binary search.
                If not found.
                        Issues = Issues + CollectIssue(activity-ActivityID, "A network activity with reference point
                                has no components assigned"(11), 3).
    Return Issues.
```

FIG. 9J

```
* Method "HasComponentActivity"
* The network components (component demand that is having a specific demand date and quantity) are
* passed to this method in parameter IT_COMPONENTS. BOM items are master data, which define the
* components needed for a typical base quantity of the end item. The BOM items are read from the database
* only to check if the network components are assigned to the same reference points to which they should be
* assigned.
HasComponentActivity(it_ComponentDemand, it_activities).
    If filter-HasComponentActivity = false.
        Exit.
    Lt_bom_items = select ReferencePoint from BOMItemTable
        for all entries in it_components
        where BOMItemId = it_components-BOMItemId.
    Sort it_activities by ActivityID.
    Sort it_bom_items by BOMItemID.
    For every component in it_ComponentDemand.
        If component-ActivityID is initial.
            Issues = Issues + CollectIssue(component, "Component not assigned to activity"(12), 3).
            Continue.
        activity = read it_activities with key ActivityID = component-ActivityID binary search.
        If not found.
            Issues = Issues + CollectIssue(component, "Referenced activity does not exist"(13), 3).
            Continue.
        If activity-ReferencePoint is initial.
            Issues = Issues + CollectIssue(activity, "Component assigned to activity w/o reference point"(14), 3).
            Continue.
        BomItem = read It_bom_items with key BOMItemID = component-BOMItemID binary search.
        If BomItem-ReferencePoint <> activity-ReferencePoint.
            Issues = Issues + CollectIssue(activity, "Component assigned to activity w/ wrong reference point"(15), 3).
    Return Issues.
```

FIG. 9K

```
* Method "IsBomComplete"
* Checks if a component demand exists for all BOM items determined by BOM explosion.
* BOM explosion creates component demand for a BOM item if the BOM item is valid at the explosion date
* and if the BOM item is needed for the configuration, model, and unit requested by the customer. This        938
* is complicated logic. Therefore, this method call the regular BOM explosion method, which is also used
* when creating a production order or a network.
IsBomComplete(it_boms, it_ComponentDemand, it_activities).
        If filter-IsBomComplete = false.
                Exit.
        Sort it_activities by rfpnt.
        Sort it_ComponentDemand by NetworkID, BOMItemID.
        For every BOM in it_boms.
                Lt_comps = explode(BOM). "Explode the major assembly BOM
                For every component in lt_comps.
                        * Check if there is a reservation for every BOM item
                        Comp = Read table it_ComponentDemand with key NetworkID, BOMItemID binary search.
                        If not found.
                                Issues = Issues + CollectIssue(bom, "BOM item not in network's component demand"(18), 4).
                        If component-ReferencePoint is initial.
                                * BOM item has no reference point
                                * To fix the problem you must populate the reference point in the BOM item and re-explode
                                Issues = Issues + CollectIssue(BOM, "BOM item has no reference point"(16), 4 ).
                                Continue.
                        Act = Read table it_activities with key ReferencePoint = component-ReferencePoint.
                        If not found.
                                * There is no network activity to which the BOM item could be assigned
                                * To fix the problem change BOM or add a suitable network activity and re-explode
                                Issues = Issues + CollectIssue(BOM, "No network activity with reference point"(17), 4).
                                Continue.
                        If Comp-ReferencePoint <> Act-ReferencePoint.
                                Issues = Issues + CollectIssue(BOM, "Reference point in BOM and routing differs"(15), 4).
                                Continue.
        Return issues.
```

FIG. 9L

```
* Method "IsActivityDurationConsistent"
* The duration of a network activity is the time needed to assemble the parts defined in an installation kit.    940
* The same duration should be defined in the installation kit's material master as replenishment lead time.
IsActivityDurationConsistent(it_activities, it_ComponentDemand).
        If filter-IsActivityDurationConsistent = false.
                Exit.
        Lt_mat = select * from PlantMaterialTable for all entries in it_ComponentDemand
             where MaterialID = it_ComponentDemand-MaterialID and PlantID = it_ComponentDemand-PlantID.
        Sort lt_mat by MaterialID PlantID.
        Sort it_activities by ActivityID.
        For every Comp in it_ComponentDemand.
                mat = Read table lt_mat with key MaterialID = Comp-MaterialID PlantID = Comp-PlantID binary search.
                act = Read table it_activities with key ActivityID = Comp-ActivityID binary search.
                * Processing duration can depend on quantity. Here we calculate the expected duration for the activity qty
                Lv_duration = productionLeadTime(mat, act-quantity).
                If lv_duration <> act-Duration.
                        Issues = Issues + CollectIssue(act, "Duration in network activity and material master differs"(19), 4).
                If ls_act-Duration <= 0.
                        Issues = Issues + CollectIssue(act, "Zero duration in network activity"(20), 4).
        Return Issues.
```

FIG. 9M

```
* Method "IsNetworkScheduledCorrectly"
* Check if activities are scheduled as defined by precedence relationships
IsNetworkScheduledCorrectly(it_activities).
    * Exit if check is not needed
    If filter-IsNetworkScheduledCorrectly = false.
        Exit.
    * Read precedence relationships from the database
    It_relationships = select * from RelationshipTable
        For all entries in it_activities
    where PredecessorActivityID = it_activities~ActivityID.
    If It_relationships is empty.
        Exit.
    * Check dates of activities connected by relationships
    Sort it_activities by ActivityID.
    For every rel in It_relationships.
        Predecessor = read table it_activities with key rel-PredecessorActivityID binary search.
        Assert sy-subrc = 0.
        Successor = read table it_activities with key rel-SuccessorActivityID binary search.
        Assert sy-subrc = 0.
        If rel-RelationshipType = 'FS'. "Finish-Start
            If predecessor-EarliestEndDate > successor-EarliestStartDate  "Check earliest execution dates
            Or predecessor-LatestEndDate > successor-LatestStartDate.  "Check latest execution dates
            Issues = Issues + CollectIssues("Network activity starts earlier than predecessor is completed"(22), 6).
        If rel- RelationshipType = 'FF'.  "Finish-Finish
            If predecessor-EarliestEndDate > successor-EarliestEndDate  "Check earliest execution dates
            Or predecessor-LatestEndDate > successor-LatestEndDate.  "Check latest execution dates
            Issues = Issues + CollectIssues("Network activity ends earlier than predecessor ends"(23), 6).
        If rel- RelationshipType = 'SF'.  "Start-Finish
            If predecessor-EarliestStartDate > successor-EarliestEndDate  "Check earliest execution dates
            Or predecessor-LatestStartDate > successor-LatestEndDate.  "Check latest execution dates
            Issues = Issues + CollectIssues("Network activity ends earlier than predecessor ends"(23), 6).
        If rel- RelationshipType = 'SS'.  "Start-Start
            If predecessor-EarliestStartDate > successor-EarliestStartDate  "Check earliest execution dates
            Or predecessor-LatestStartDate > successor-LatestStartDate.  "Check latest execution dates
            Issues = Issues + CollectIssues("Network activity starts earlier than predecessor is started"(23), 6).
    Return Issues.
```

```
* Method "AreNestedMajorAssembliesConnected"
* Check if networks of nested major assemblies are connected with precedence relationships. This relationship is
* necessary to determine the end-date of the child network, which models the assembly of the nested major assembly.
* you first have to complete the nested major assemblies before you can use them as components in a parent major
* assembly.
* In the case of nested major assemblies there should be reservations for the major assemblies,
* If there are nested major assemblies the system creates the set of expected relationships and then compares     944
* with the existing relationships.
* This method needs not be recursive (unlike the creation of projects for nested major assemblies) because
* all networks of the project on any level can be selected via the model and unit.
AreNestedMajorAssembliesConnected(it_boms, it_activities, it_networks, it_ComponentDemand).
       * Exit if check is not needed
       * This check requires explosion of all installation kits of every checked major assembly. The check is expensive.
       * Therefore, we should only perform the check if major assembly issues are required
       If filter-AreNestedMajorAssembliesConnected = false
       and filter-NetworkExistsForNestedMajorAssembly = false
                 Exit.
       * Determine nested major assemblies
       Sort it_ComponentDemand by MaterialID PlantID ProjectID.
              For every InstallationKit in it_ComponentDemand.
                     Lt_comps = explode(InstallationKit). "Explode the installation kit BOM (next level BOM)
              Lt_Materials = Select * from MaterialTable
                     for all entries in lt_comps
                     where MaterialID = lt_comps~MaterialID.
                     Sort lt_Materials by MaterialID.
                     For every component in lt_comps.
                            Mat = Read Lt_Materials with key component-MaterialID binary search.
                            If Mat-Type <> 'MajorAssembly'.
                                   Continue. "If there is no nested major assembly, then there is nothing to do and we can exit.
                            * We found a nested major assembly
                            * First check if a network exists for the nested major assembly
                            MA = Read table it_boms with key component-matnr component-werks.
                     If not found.
                     If filter-NetworkExistsForNestedMajorAssembly = true.
                                   Issues = Issues + CollectIssue(bom, "No network exists for major assembly"(25),4).
                            Continue. "Check if next ik-component is a major assembly
                     * Here we determine expected relationships
              * The expected relationship connects the last activity of the child / nested network and the parent network
                     * activity consuming the child major assembly. A reservation identifies the consuming activity.
                            LastAct = DetermineLastActivity(MA-aufnr, it_activities, it_networks).
                            ConsumingAct = DetermineConsumingActivity(MA-MaterialID, MA-PlantID, MA-ProjectID, it_components).
                     rel-PredecessorActivityID = LastAct-ActivityID.
                     rel-SuccessorActivityID = ConsumingAct-ActivityID.
                     ExpectedRelationships = ExpectedRelationships + rel.

* Exit if possible
       If filter-AreNestedMajorAssembliesConnected = false.
                 Exit.

* Read existing relationships from the datebase.
              ExistingRelationships = select * from RelationshipTable
              For all entries in ExpectedRelationships
              Where PredecessorActivityID = ExpectedRelationships-PredecessorActivityID
              And    SuccessorActivityID  = ExpectedRelationships-SuccessorActivityID.
              * Compare expected and existing relationships
              Sort ExistingRelationships by PredeccorActivityID SuccessorActivityID.
              For every rel in ExpectedRelationships.
                     existingRel = Read table ExistingRelationships with key rel-PredeccorActivityID SuccessorActivityID.
                     If not found.
              Issues = Issues + CollectIssues("The networks of a nested major assembly and its parent network
                     are not connected by precedence relationships"(24), 5).
              * Return Issues
              Return Issues.
```

FIG. 9O

```
* Method "DetermineLastActivity"
* Determines the last activity of a network.
* The last activity of a network does not have any successor activities.
* There may be several network activities without successor. Within the sub-group of activities without successor
* the method selects the activity with the highest activity number.
DetermineLastActivity(iv_NetworkID, it_activities, it_networks)
        * Determine current network
    Network = Read table it_networks with key iv_NetworkID.
        Assert sy-subrc = 0.
        * read relationships
        For every activity in it_activities where activity-NetworkID = iv_NetworkID.
                Append activity to lt_activities.
        Lt_relationships = select * from RelationshipTable
                For all entries in lt_activities
        where PredecessorActivityID = lt_activities~ActivityID.
        * find activities without successor
        Sort lt_relationships by PredecessorID.
        For every activity in it_activities where activity-NetworkID = iv_NetworkID.
                Read table lt_relationships with key PredecessorActivityID = activity-ActivityID.
                If not found.
                        ActivitiesWithoutSuccessor = ActivitiesWithoutSuccessor + activity.
        * Find activity with highest number
        For every activity in ActivitiesWithoutSuccessor.
                If activity-ActivityID > HighestActivityID.
                        HighestActivityID = activity-ActivityID.
                        SelectedActivity = activity.

* Return result
        Return SelectedActivity.
```

```
* Method "Explode"
* The method shall call function module CS_BOM_EXPLOSION or CS_BOM_EXPL_MAT_V2 just like CN33_N
* The BOM shall be exploded with the current BOM version, the BOM version defined in table MPE_BOM_PS_REL.
* The latest BOM version may have different components, which will result in different issues. Those issues will
* become visible only after upgrading the BOM version using transaction CN33_N for example.
Explode(BOM).
        Call function CS_BOM_EXPLOSION
                exporting BOM-matnr BOM-werks BOM-stlnr BOM-stlal BOM-stlan BOM-bom_versn BOM-techs
                importing components.
        return components.
```

FIG. 9Q

```
* Method "Collect_issue"
CollectIssue(Reference, issue, sequence).
        New issue.
        Issue-reference = Reference.
        Issue-issue = issue.
        Issue-sequence = sequence.
        Append Issue to Issues.
        Return Issues
```

```
* Method "ProductionLeadTime"
* The inhouse production time can be quantity dependent or quantity independent. The duration in
* working days can be calculated as follows
ProductionLeadTime(is_mat, iv_quantity, iv_UoM).
        Lv_quantity = QuantityConversion(iv_quantity, iv_UoM, is_mat-meins).
    If is_Mat-ruezt is not initial or is_Mat-bearz is not initial.
        Duration = is_Mat-ruezt + is_Mat-tranz + RoundUp(is_Mat-bearz * lv_quantity / is_Mat-basmg)
    Elseif Ls_Mat-dzeit is initial.
        Duration = 1.
    Else.
        Duration = Ls_Mat-dzeit.
        Return Duration.
```

```
* Method "Display_issue"
* Displays issue and allows drill-down into BOM, network, or explosion if allowed by issue.
Display_issues(Issues).
        Sort Issues by Sequence
        For every Issue in Issues
                Display_issue(Issue)
```

```
* Method "DetermineConsumingActivity"
DetermineConsumingActivity(iv_MaterialID, iv_PlantID, iv_ProjectID, it_ComponentDemand).
        Reservation = read table it_ComponentDemand with key MaterialID = iv_MaterialID
                PlantID = iv_PlantID ProjectID = iv_ProjectID.
        If not found.
                CollectIssue("Reservation missing for &material in &plant").
                Exit
        Return Reservation-ActivityID.
```

AUTOMATED GENERATION AND CONSISTENCY CHECKING OF SOFTWARE OBJECTS

FIELD

The present disclosure generally relates to creating software data objects and for checking such data objects for consistency. Particular implementations relate to creating activity object instances, and for analyzing such activity object instances with respect to other activity object instances or with respect to a corresponding collection object instance.

BACKGROUND

In carrying out a computer-implemented or computer-facilitated process, data used in carrying out the process is often maintained in separate systems or used by different applications, which can make an overall process more complex. The complexity can include complexity in handling the process as a whole, as opposed to the individual components, as well as increased complexity in transitioning from one part of the process to another part of the process. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for creating activity object instances corresponding to collection object instances, and for conducting tests between activity object instances and collection objects instances, and within a set of activity object instances. Tests can include determining whether collection object instances have counterpart activity object instances, and evaluating a collection object instance with respect to a corresponding activity object instance. Activity object instances can be set to be performed in a sequence, and a test can determine whether the sequence is consistent with sequencing rules. When activity object instances are automatically created from collection object instances, a user can be presented with a graphical user interface that includes representations of activity object instances, and the user can manipulate the graphical user interface to provide precedence information.

In one aspect, a method is provided for generating activity object instances corresponding to collection object instances. A call is received to create activity object instance for a set comprising a plurality of collection object instances. The request includes an identifier of the set. The plurality of collection object instances in the set are retrieved. At least a portion of the collection object instances each specify a plurality of component object instances.

Activity objects are instantiated for the collection object instances. A given activity object instance includes an activity object identifier variable, one or more variables corresponding to component object identifiers for the one or more component object instances specified in a corresponding collection object instance, a sequence variable, at least one precedence variable, and a span variable. The values of the activity object identifier variables for the instantiated activity objects are returned in response to the call. Visual elements are displayed on a graphical user interface for at least a portion of the instantiated activity objects. User input is received, providing precedence values for at least a portion of the instantiated activity objects. The precedence values are assigned to the at least one precedence variable of the respective instantiated activity objects.

According to another aspect, a method is provided for determining consistency between activity object instances and collection object instances. A consistency check request is received to analyze data consistency of a first set of a plurality of collection object instances with a second set of a plurality of activity object instances. A given collection object instance includes a third set of one or more identifiers for one or more component object instances and a given activity object instance includes a fourth set of one or more identifiers for one or more component object instances.

A first consistency check is executed for activity objects instances of the plurality of activity object instances. The executing includes determining a collection object instance referenced by the activity object instance. The executing includes determining whether at least a first value stored in the collection object instance is consistent with at least a second value stored in the activity object instance. Consistency check results are returned.

In a further aspect, a method is provided for executing consistency checks for a set of activity object instances. A test request is received to analyze data consistency of a first set of activity object instances. A given activity object instance includes an activity object identifier variable, one or more component object instance identifier variables, a sequence variable, at least one precedence variable, and a span variable. Activity object instances of the first set are retrieved. The at least a first test is executed by comparing data stored in respective activity object instances with a rule specified for the at least a first test to provide first test results. The first test results are returned in response to the check request.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 9A-9U present pseudocode that can be used to implement various disclosed technologies, including consistency checks between collection object instances and activity object instances and within a set of activity object instances.

DETAILED DESCRIPTION

Example 1—Overview

Figure 1:
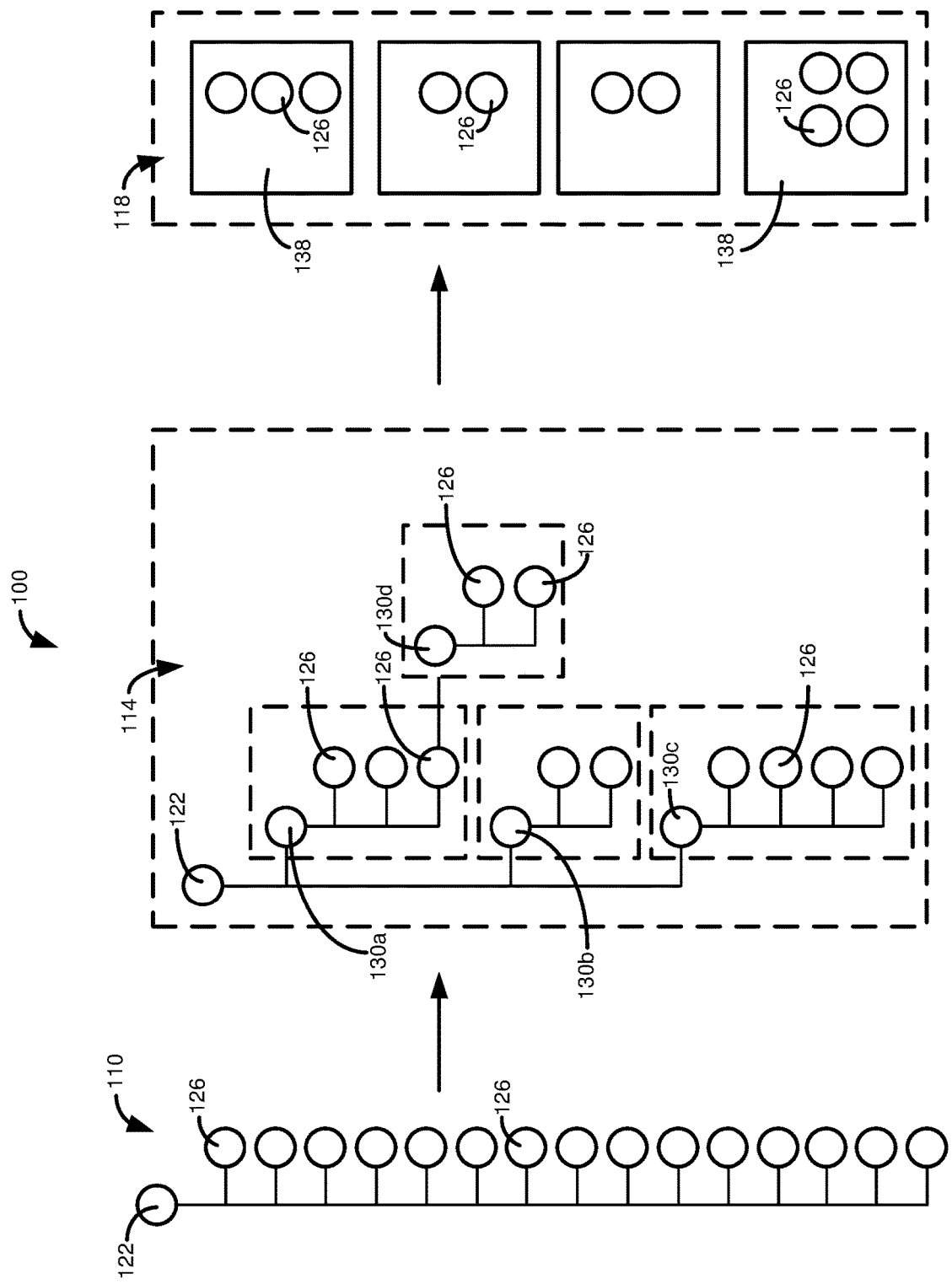
FIG. 1 is a diagram illustrating a relationship between a component data structure, a collection data structure, and an activity data structure.

In carrying out a computer-implemented or computer-facilitated process, data used in carrying out the process is often maintained in separate systems or used by different applications, which can make an overall process more complex. The complexity can include complexity in handling the process as a whole, as opposed to the individual components, as well as increased complexity in transitioning from one part of the process to another part of the process. Accordingly, room for improvement exists.

Some overall processes can be divided into different phases or categories. A first phase may involve determining what resources are needed for a task, and a second phase may include determining how those resources should be processed to achieve a desired result. A third phase can include overseeing the execution of the process, such as to account for issues that may arise during execution of the process, which can include changes to process parameters. These changes can result in revisiting other phases of the process, such as adding, removing, or changing resources used in the first phase, or adding, moving, or adjusting how tasks are scheduled in the second phase.

As an example, a computer-implemented task may require particular inputs, such as files or other sources of stored data, user input, or sensor data. Typically, these inputs will need to be processed in a particular way to achieve a desired result of a process. For instance, data from first and second files may first be read, and then processed to provide an intermediate result. The intermediate results can then be combined with data from a third file, and subjected to additional processing before a final result is obtained.

While some processes can be comparatively simple, others can be very complex, and software programs can be developed to facilitate process definition, and possibly process execution. For instance, a software program can facilitate tracking, and possibly determining, what inputs are required for a particular task. The program might be used by a first type of user to define what inputs are required. Another software program (or module or component of a software program) might be used to schedule the inputs in an overall process, where the scheduling might be carried by one or more users, or at least part of the scheduling may be carried out automatically.

A variety of problems can arise in defining inputs for a process, and scheduling the tasks for execution. For example, a problem can arise if not every input is associated with an activity or task in the scheduling software. Again, for simple processes, it may be relatively trivial for a user to ensure that all inputs have been scheduled. However, ensuring that all inputs have been scheduled can rapidly become more complex as the number of inputs increases.

Scheduling can also quickly become very complex to deal with, both as the number of inputs increases, and as inputs may be interrelated. That is, one or more inputs may produce one or more outputs, which outputs may themselves serve as inputs for other activities. In addition, processing resources used in carrying out the process may be finite, and may have different types. Accordingly, scheduling can include taking into account which inputs should be processed first so that they can provide outputs required for other activities and determining a priority of order between activities for a finite processing resource, including accounting for different process resource types and their respective capacities.

Production process definition and scheduling software is another example that highlights issues in current software-based approached to process definition and scheduling. A first stage of producing a final output, such as a boat or an aircraft, can include professionals such as engineers and architects determining the components that will be included in the output. An output of this phase of a production process can include an engineering bill of materials (or e-BOM). In some cases, the e-BOM can be a "flat" list of components that will be required in the final output. The e-BOM can be transformed into a manufacturing bill of materials (or m-BOM).

The m-BOM can organize components in the e-BOM into collections or kits, where a collection may include one or more components and may be configured to represent a discrete unit of work in the production process. In at least some cases, the discrete unit of work is configured to be performed by a particular type of resource, such as an individual having a particular skill or qualification (for example, electrician, plumber, welder, etc.). Typically, the collections are configured to represent work that can be completed with a reasonable time (e.g., a determined, such as a predetermined, time), and typically work that represents a single processing resource type (e.g., a first collection may represent components to be used in work to be performed by a plumber, either for a discrete part or otherwise representing a convenient unit in the production process, and another collection may represent components to be used in work to be performed by a welder).

Collections can be nested, such that one or more collections may represent an input that is used in another collection. The process can organize inputs in other ways, such as by major assemblies, which in a way can be similar to a collection, but possibly with a large number of underlying collections that are needed before the major assembly is produced. Major assemblies, typically a plurality of major assemblies, are incorporated into a final output. For example, a large cruise ship may be constructed from a handful of major assemblies, when those major assemblies are complete. Each major assembly can represent the completion of tens or hundreds (or more) of collections, each of which can have tens or hundreds (or more) inputs/components.

Various aspects of a process, including a production process, can be represented by software objects. For instance, a component or other input can be associated with an identifier, where the identifier can identify a particular instance of a datatype or programmatic object used to represent an input. Datatypes can include abstract data types (e.g., a class for an input, or an input of a particular type, where an instance of the class can represent a particular input), composite datatypes (e.g., structs), or a record in a database table representing a particular entity type (e.g., a table for "inputs," or inputs of a particular type). Along with an identifier, a programmatic representation of an input can include additional properties (e.g., data members or attributes), such as a quantity (a quantity required, a quantity available, a quantity on order), a cost, a location (e.g., a warehouse or facility where the input is located), a textual description of the input (e.g., "flaperon"), a supplier identifier, a process step identifier (e.g., for a processing step where the input is used), an indicator of whether the input is an "off the shelf" input or is produced from other inputs during the manufacturing process, a resource type (e.g., electrical, plumbing, which can be used, in at least some cases, to correlate the part with a processing resource class), combinations of these attributes, or different or additional attributes.

In a similar manner, a collection or kit can be represented by a software object. A software object for a collection can include an identifier of the collection, a list (or other data structure, such as an array, a vector, or a tree) of component identifiers, one or more identifiers useable to position the collection in a particular location (e.g., functional module/ major assembly) of the output, one or more identifiers useable to identify a processing resource type needed to process the collection during the process (e.g., "electrical," "plumbing), combinations of these attributes, or different or additional attributes. In particular implementations, a collection that depends on one or more other collections, or on which one or more other collections have a dependency, can include identifiers for such collections. For instance, assume a first collection needs to be completed before a second collection can be completed. The first collection can include an identifier of the second collection, and an indication that the second collection depends on the first collection. The second collection can include an identifier of the first collection, and an indication that the second collection depends on the first collection As discussed above, scheduling can be facilitated through the use of collections, where a collection can represent the unit of scheduling, and where larger structures (e.g., major assemblies) can be defined with respect to multiple collections. In at least some implementations, an m-BOM does not itself include scheduling information. Rather, a project management tool (e.g., software that provides functionality equivalent to a Gantt chart or other scheduling tool) may be used to configure orders in which collections will be processed, including taking into account dependencies between collections (and structures, such as major assemblies, which may be formed from such collections) and processing resource constraints (e.g., a limited number of machines or individuals for performing a particular type of task are available).

The production of complex products, such as aircraft or cruise ships, can be difficult to manage, including generating some of the problems noted above. For example, for an output that might be produced with millions of components and hundreds or thousands of collections, it can be difficult to ensure that every collection is associated with a corresponding activity (e.g., an instance of a datatype or programmatic object representing an activity) in a scheduling software tool. Part of the difficulty in managing a complex production process can arise from different individuals, with different skill sets, being responsible for different phases of the process—such as product engineers designing an end item, production engineers designing a production process, and production planners determining how the production process should be scheduled. If these different groups use different software, or even different components or modules of a software suite where the components and modules are not suitably integrated, additional difficulties can arise. For example, production planners may need to manually create software objects to be scheduled in a process, where different software objects were created by production engineers.

Creating software objects for such activities manually, which to date has been the typical process, can be time consuming, tedious, and prone to errors. Issues can also arise if changes occur during the production process, at least in part because different individuals may be responsible for managing different types of data (e.g., a product specification versus a production process specification). For example, for various reasons, engineering requirements may change during production. If a structure like an e-BOM or an m-BOM (which can be represented as data structures, such as trees, heaps, or graphs, of software objects representing components or collections) is updated, such changes may not automatically be propagated to a software program or component that handles scheduling (e.g., scheduling of activity object instances).

Disclosed technologies can provide solutions to help resolve these issues. For example, the disclosed technologies can implement various types of consistency checks (or tests) to manage or analyze relationships between collection objects (instances of an object or data type representing collections, such as in an m-BOM) and activity objects (e.g., instances of an object or data representing activities, such as in one or more networks associated with a process). Initially, a disclosed technology can facilitate the scheduling process by creating activity object instances for a set of collection object instances (e.g., instances of an object or data type representing collections or kits, such as in an m-BOM).

Creating activity object instances can include reading collection object instances in a set, instantiating an activity object for a given collection object instance, and populating at least some of the attributes or data members of that activity object instance with data from, or derived from, data in the collection object instance. Data that can be copied from a collection object to an activity object can include a collection object identifier, identifiers for components (or inputs, such as raw materials, items that can be sourced from a supplier, or other components, tools, documents, work instructions, labor, etc., where the components/inputs are used in at least part of an overall process) included in the collection object, a type (e.g., in manufacturing, an employee type, such as "electrician," or a particular type of production equipment, such "CNC mill"). The activity objects can then be made available for scheduling, either manually or in an automated or semi-automated manner, where additional values, such as sequence information/ dependencies between activity objects instances can be added to the activity object instance. The automated creation of activity object instances can both reduce effort, as manual creation of activity objects may not be needed, or at least reduced, and the chance of errors, including missing activity object instances, can be reduced.

As an example of a consistency check provided by the disclosed technologies, periodically or upon the occurrence of a trigger event, including user input or a change to a computer-representation of an e-BOM or an m-BOM (or similar structures in contexts other than production), it can be determined whether a set (including all) collection objects have a matching activity object in a set of activity objects. If a discrepancy is found, an alert can be generated, or other or additional actions taken, such as to create missing activity object instances.

Consistency checks can also be provided within a given set of objects associated with a process. For instance, a set of activity object instances can be analyzed to determine whether the set is internally consistent. Internal consistency might be violated, for example, if a given activity object instance requires a particular component or collection that serves as input for the activity object instance to be available, but the component or collection is not scheduled to be completed until after a date indicated in the given activity object instance. It should be appreciated that manually determining whether scheduling is correct under this consideration can be, at best, exceedingly difficult when large numbers of activity objects/components are used in a process.

Example 2—Example Relationships Between Data Structures for Components, Collections, and Activities FIG. 1 illustrates a programming environment 100 that includes a component data structure 110, a collection data structure 114, and an activity data structure 118. The component data structure can represent, in the example of a production process, an engineering bill of materials (e-BOM). The component data structure 110 can include a plurality of instances of a datatype or programmatic object representing components 126 used in an output 122 (where the output can be, for example, a finished product, and may also be represented by an instance of a datatype or programmatic object for finished objects).

The component data structure 110 can be, in various examples, a data structure such as a tree, a list, a stack, a queue, a heap, a graph, or an array. The component data structure 110 can be another type of programmatic object, such as a table (e.g., in a relational database system) that includes records corresponding to the components 126. The components 126 can be associated with an identifier and one or more other data members or attributes.

In at least some cases, the component data structure 110 is a "flat" structure that does not provide an order or other organization that relates to how the components 126 will be used in a production process. That is, the components 126 might be included in an order, such as in alphabetical or numerical order, but that order typically does not reflect an order in which the components will be processed, including relationships between components (e.g., which components are needed for a sub-process that occurs before a component used in a later process). In some cases, all of the components 126 are components that are obtainable from a supplier or similar source. That is, such components are not produced in a process that uses the components 126. In other cases, at least a portion of the components 126 can be components that are produced during a process that uses other components, which may be "off the shelf" components.

The component data structure 110 can be converted to the collection data structure 114. In some cases, the conversion can be a manual process, but facilitated by software. For example, a graphical user interface can be displayed that allows a user to group components 126 into collections 130, where a collection can be represented as an instance of a datatype or programmatic object (including in one or more database tables, such as a table for collections which includes an attribute for a collection identifier and records for components in the collection can include the collection identifier). In some cases, and as shown, the components 126 (e.g., the datatype instances or instances of a programmatic object) in the collection data structure 114 can be the same as in the component data structure 110. For example, the datatype/object instances of the components 126 can be updated with values for the collection 130 to which the components belong, or the datatype/object for the collection can include the identifiers for the components in that collection. In the event that the collection data structure 114 uses components 126 in a different format (e.g., in a different program or computing system, or otherwise in different datatype or object), at least some of the data associated with the components can be used to create/populate the representations of the components as used in the data structure 114. The data structure 114 can at least generally be similar to the data structure 110, in terms of how it may be implemented.

Like the data structure 110, the data structure 114 can organize components 126 and collections 130 with respect to the output 122. Some of the collections 130, such as collections 130a, 130b, 130c, can be "flat" relative to one another. That is, collections 130a, 130b, 130c do not depend on each other or have an order or other organization, other than the collections 130a, 130b, 130c being used, together, to produce the output 122. The collections 130a, 130b, 130c can represent, in a production process, major assemblies, where a major assembly may be produced from additional collections 130, including additional collections having a hierarchical relationship (e.g., where the hierarchy indicates an order or precedence relationship, such as a lower level, further from the root, collection being needed for a collection at a higher level, closer to the root).

The collection 130d is shown as being an input for the collection 130a. Thus, the collection 130d is required before the collection 130a can be processed. The collection 130d demonstrates how the output of a collection can be a component 126 of another collection 130.

The activity data structure 118 can be produced from the collection data structure 114 (e.g., by "exploding" the collection data structure), and can generally be implemented in a similar manner as the component data structure 110 and the collection data structure 114. The activity data structure 118 includes a plurality of activities 138, where an activity can be represented as an instance of a datatype or programmatic object (including as one or more tables in a relational database system). The instances of the activities 138 can include data members or attributes that specify various properties of an activity, such as an identifier for the activity, components 126 in the activity, an identifier for a collection 130 that corresponds to the activity, an activity type, scheduling information, precedence information, processing resource requirements, etc. In some cases, an activity 138 includes references to the components 126 used in the collection (either as implemented in the component data structure 110 or in an alternative representation). In other cases, an activity 138 can directly include (or directly reference, as opposed to referencing the information through a component 126) information for components 126.

The activity data structure 118 can be produced manually from the collection data structure, in some cases. In other cases, the activity data structure 118 can be generated automatically from the collection data structure 114, at least in part. For example, a computer-implemented process can read the collection data structure 114 and create activity instances 138 for collection instances 130 in the collection data structure. Automatically creating activity instances 138 can include populating the activity instances with references to the components 126 of the corresponding collection instance 130, or with other/additional information regarding such components (e.g., depending on whether the activity instances 130 are configured to store references to component instances 126 or include information from component instances).

Figure 2:
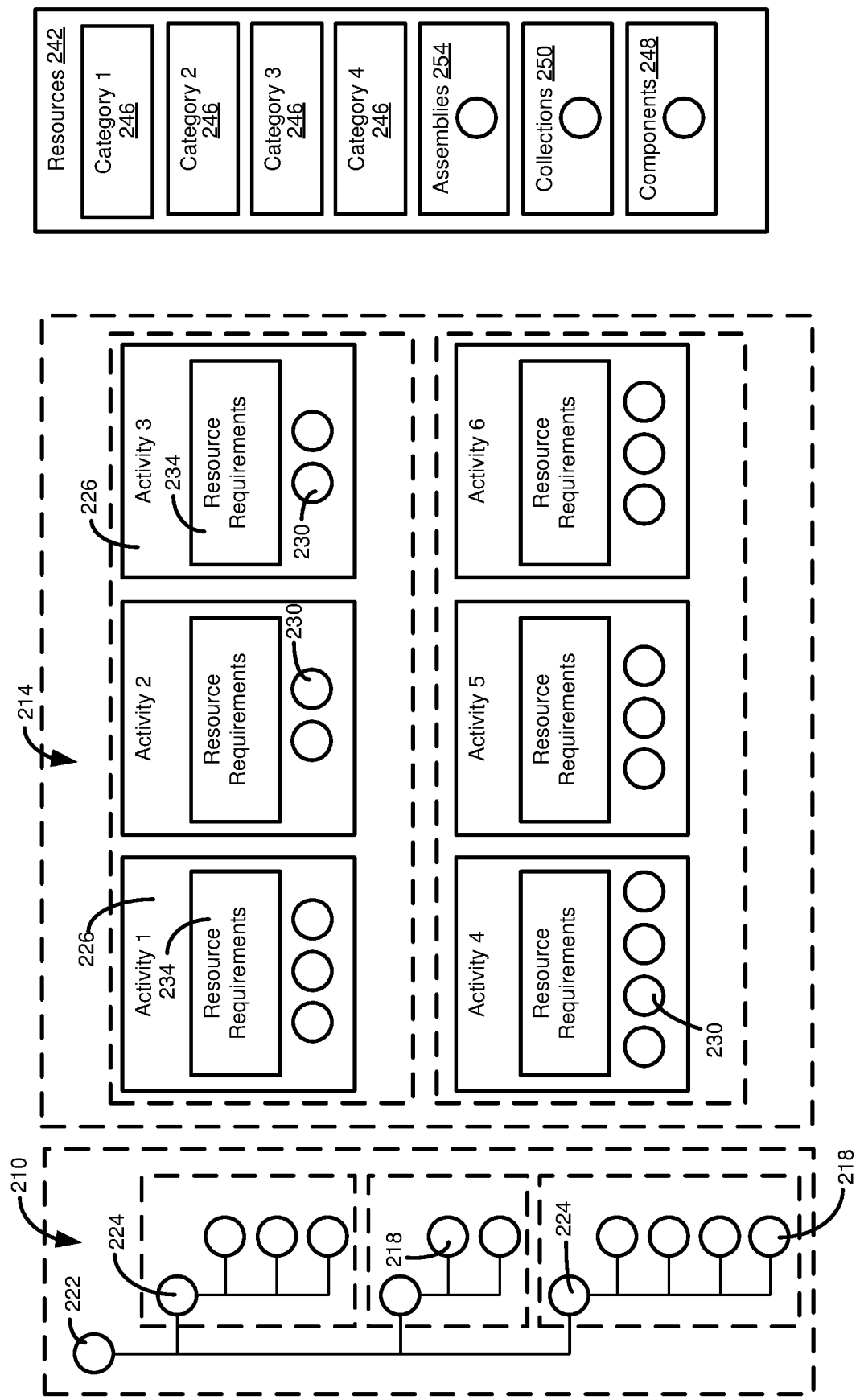
FIG. 2 is a diagram illustrating a relationship between collection object instances of a collection data structure and activity object instances of an activity data structure.

Example 3—Example Relationships Between Collection Instances and Activity Instances FIG. 2 provides further details regarding how a collection data structure 210, which can be implemented as described for the collection data structure 110 of FIG. 1, can relate to an activity data structure 214, which can be implemented as described for the activity data structure 118. The collection data structure 210 can include component instances 218, which can be implemented as described for the component instances 126, for an output 222, which can be implemented as described for the output 122. One or more, typically a plurality, of component instances 218 can be included in collection instances 224, which can be implemented as described for the collection instances 130. In some cases, collection instances 224 can be nested, including having a collection instance serve as a component 218 for another collection instance.

The activity data structure 214 can includes a plurality of activity instances 226, which can be implemented as described for the activity instances 138. For example, the activity instances 226 can include component references 230 (e.g., identifiers for component instances 218), or information obtained from, or corresponding to, the component references. The activity instances 226 can also include resource requirement information 234. The resource information 234 can include information about resources needed to complete or schedule the corresponding activity instance 226. Resource information 234 can identify a resource, or resource type, and, in at least some cases, an amount of the resource that is needed. For example, the resource information 234 can indicate information such as "2 electricians needed for two weeks," "60 man hours of time of electrical engineering support over two weeks," "use of a CNC mill for 2 hours a day over two weeks," "500 TB of storage," "20% of system CPU resources for computations conducted over two days," etc. An activity instance can include additional, or alternative, information, as will be further described in Example 4.

In at least some cases, resources that might be available for use in a process that is carried out using the activity data structure 214 can be tracked in a resource store 242. The resource store 242 can include information about various resource categories 246, where a resource category may represent any resource needed to carry out the process associated with the activity data structure 214. Typically, tracked resource categories 246 include a finite amount of resources, where a resource may be finite in that only a certain amount of a resource is available for concurrent use, but the resource is otherwise not depleted through use, or can be finite in the sense that only a set quantity is available for use, either because that is all the resource that is available, in an absolute sense, or because that is all of the resource that has been made available for use by the activity data structure 214, or a group of processes where one of the processes is a process associated with the activity data structure.

The resource store 242 can track other types of resources, other than processing resources, that might be relevant to a process that uses the activity data structure 214. In particular, the resource store 242 can track component availability 248, which can be the components associated with the component instances 218, collections 250, which can be produced from a plurality of components 218 (and optionally other collections 250 or assemblies 254), and assemblies 254, which can be produced from a plurality of collections 250.

The resource store 242 can track the availability of resources, such as in real time, in particular implementations. For example, as components 218, collections 224, and assemblies are used, or marked for use, the amount of available elements in the corresponding structures 248, 250, 254 can be updated. Similarly, as components 218, collections 224, and assemblies are produced or obtained, the amount of available elements in the corresponding structures 248, 250, 254 can be updated. In addition to, or in place of, storing a current amount of a resource, components of the resource store 242 can include information about when resources will be expected to be needed or used. Planning and use information can be incorporated into the resource store 242 through integration into various software systems, such as inventory management systems and scheduling systems.

The data structures 210, 214 and the resource store 242 can be used to conduct various types of consistency checks, along with, as described in Example 2, initially populating activity instances 226 based on the collection instances 224 in the collection data structure 210. One disclosed consistency check determines whether each collection instance 224 in the collection data structure 210 is associated with an activity instance 226 in the activity data structure 214. As an example of why this check can be helpful, the collection data structure 210 can change, including during execution of a production process, such as if components 218 used in a collection instance 224 change (e.g., different components are used, components are added or removed), or if relationships between collection instances change.

During this consistency check, if it is determined that a collection instance 224 is not associated with a corresponding activity instance 226, an activity instance can be created for that collection instance. Or, if a threshold number of such collection instances 224 are identified, where the threshold can be a single instance, in a particular implementation, an import process can be triggered such that all collection instances 224 are imported as activity instances 226. However, if an activity instance 226 for a given collection instance 224 already exists, the import process can be skipped. Alternatively, data in the activity instance 226 that has been added to the information from the collection instance 224, such as scheduling/precedence information, can be maintained.

Example 4—Example Components of Collection Instances and Activity Instances

Figure 3:
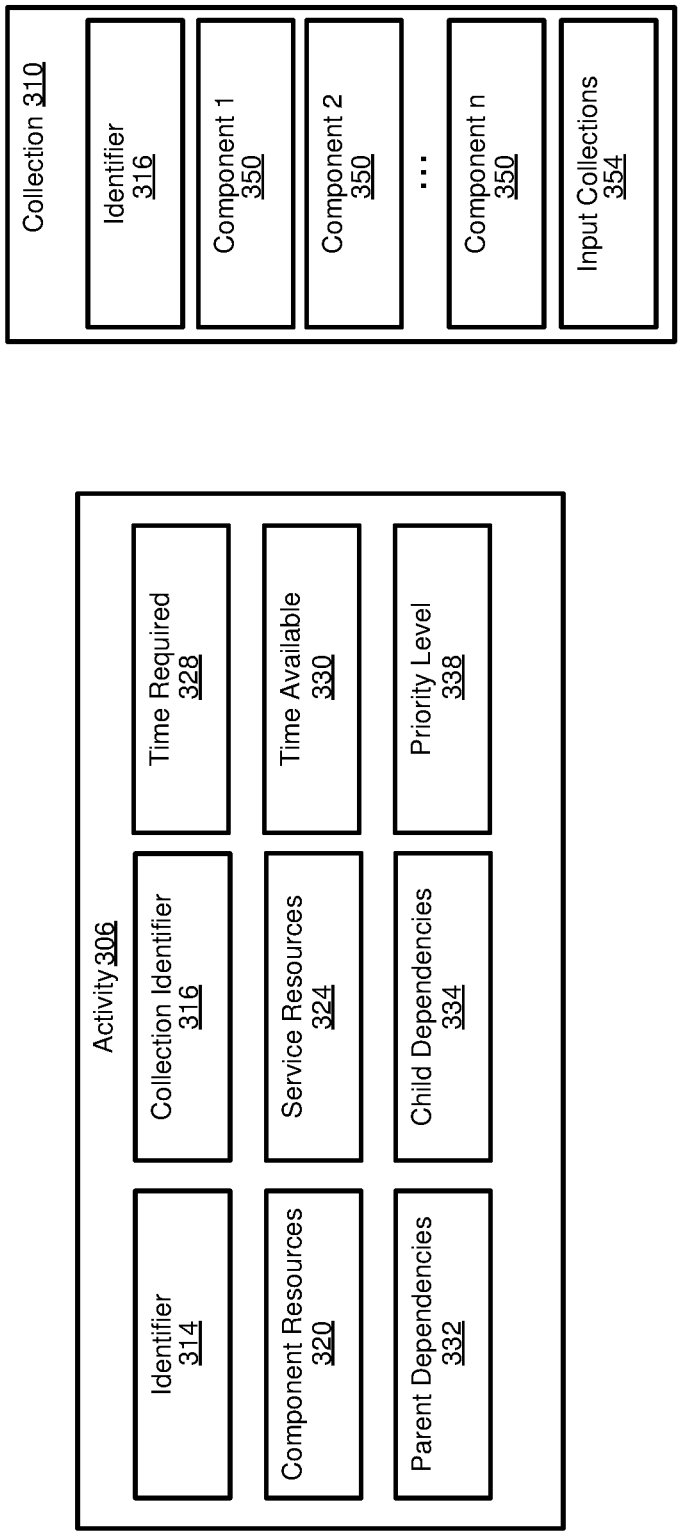
FIG. 3 is a diagram detailing elements of collection object instances and activity object instances.

FIG. 3 illustrates elements, such as data members or attributes, that may be included in an activity instance 306 and in a collection instance 310. The activity instance 306 includes an identifier 314, which can serve to distinguish the activity instance from other activity instances and to access other data maintained in the activity instance. The activity instance 306 can include a collection identifier 316. The collection identifier 316 can be a collection identifier of a collection instance 310, which identifier serves to distinguish the collection instance from other collection instances and can be used to access data maintained in the collection instance.

An activity instance 306 can include component resource information 320. The component resource information 320 can include references to (e.g., identifiers for) component instances that are associated with the collection object instance identified by the collection identifier 316 for the activity instance 306. In some implementations, in addition to, or in place of, the component identifiers, the component resource information 320 can include all or a portion of the information associated with a component instance. That is, the activity instance 306 can itself provide component-related information, rather than having to access a component instance or other data source to obtain that information.

The activity instance 306 can include service resource information 324. The service resource information 324 can describe resources that are needed to process the activity instance, such as to process (e.g., install, in the case of a production process) components specified in the component resource information 320. Service resource information 324 can include information such as a personnel or machine type needed for the activity instance, and can include information regarding an amount or duration for the resources. In at least some cases, activity instances 306 are configured such that a single type of service resource is needed. For instance, one activity instance 306 may be associated with "electricians," and another may be associated with "plumbers," rather than having a single activity instance need both electricians and plumbers. Having a single type of resource for an activity instance 306 can facilitate scheduling or definition of a process using activity instances, as it can facilitate sequential scheduling of activity instances that use the same type of resource, and parallel or concurrent scheduling of activity instances that use different resource types.

An activity instance 306 can include information related to sequencing and scheduling of the activity instance in a process that uses the activity instance. An activity instance can include a time required 328, which can be a time when the activity is scheduled to begin. The time required 328 can be useful, at is can be used to help ensure that any components or processing resources needed for the activity instance 306 are available as of the time specified in the time required 328. An activity instance 306 can include other timing information, such time as a time the activity instance will be completed or available 330, or a duration for the activity instance. A consistency check can determine, in some cases, whether the duration has been set, has a zero or null value, or is consistent with a duration set elsewhere for the activity instance.

An activity instance 306 can include one or both of parent dependencies 332 or child dependencies 334. The dependency information 332, 334 can be used to help ensure that any activity instances 306 that are child dependencies are completed before the given activity instance is set to begin, such as in the time required 328, or that the given activity instance is complete before any activity instances of the parent dependencies 332 are set to begin. The dependence and timing information 328, 330, 332, 334 can be used for various consistency checks. For example, one consistency check can examine all or a portion of activity instances 306 to determine activity instances having a time required that is before a completion time (e.g., a time available) of a parent activity object instance. Any such activity instances 306 can indicate a problem with a current scheduling of activity instances, and can, for example, be presented to a user so that the user may adjust the scheduling (or other information in an activity instance) to resolve the conflict/discrepancy.

In some cases, an activity instance 306 can include a priority level 338. A priority level 338 can be used, for example, to determine, in the case of resource conflicts, how resources should be allotted. If an activity instance 306 has many parent dependencies, for example, it may be set with a higher priority than an activity instance with no or few parent dependencies, as the activity instance 306 with a large number of parent dependencies may be more likely to delay a process using the activity instances 306.

The collection instance 310 (or a definition of a datatype used to create the instance) can include the collection identifier 316. The collection instance 310 can also include identifiers for components 350 used in the collection instance. Optionally, the collection instance 310 includes information from/for a component 350, rather than just the identifier for the component. In that scenario, information for a component 350 can be obtained directly from the collection instance 310, rather than accessing the component using an identifier obtained from the collection instance.

In at least some cases, a collection instance 310 can use one or more other collection instances as inputs, in a similar manner as the components 350. Input collection identifiers 354 (e.g., the collection identifiers 216, 354 or other/additional information) for such input collection instances 310 can be included in a given collection instance.

Example 5—Example Consistency Checks

Figure 4:
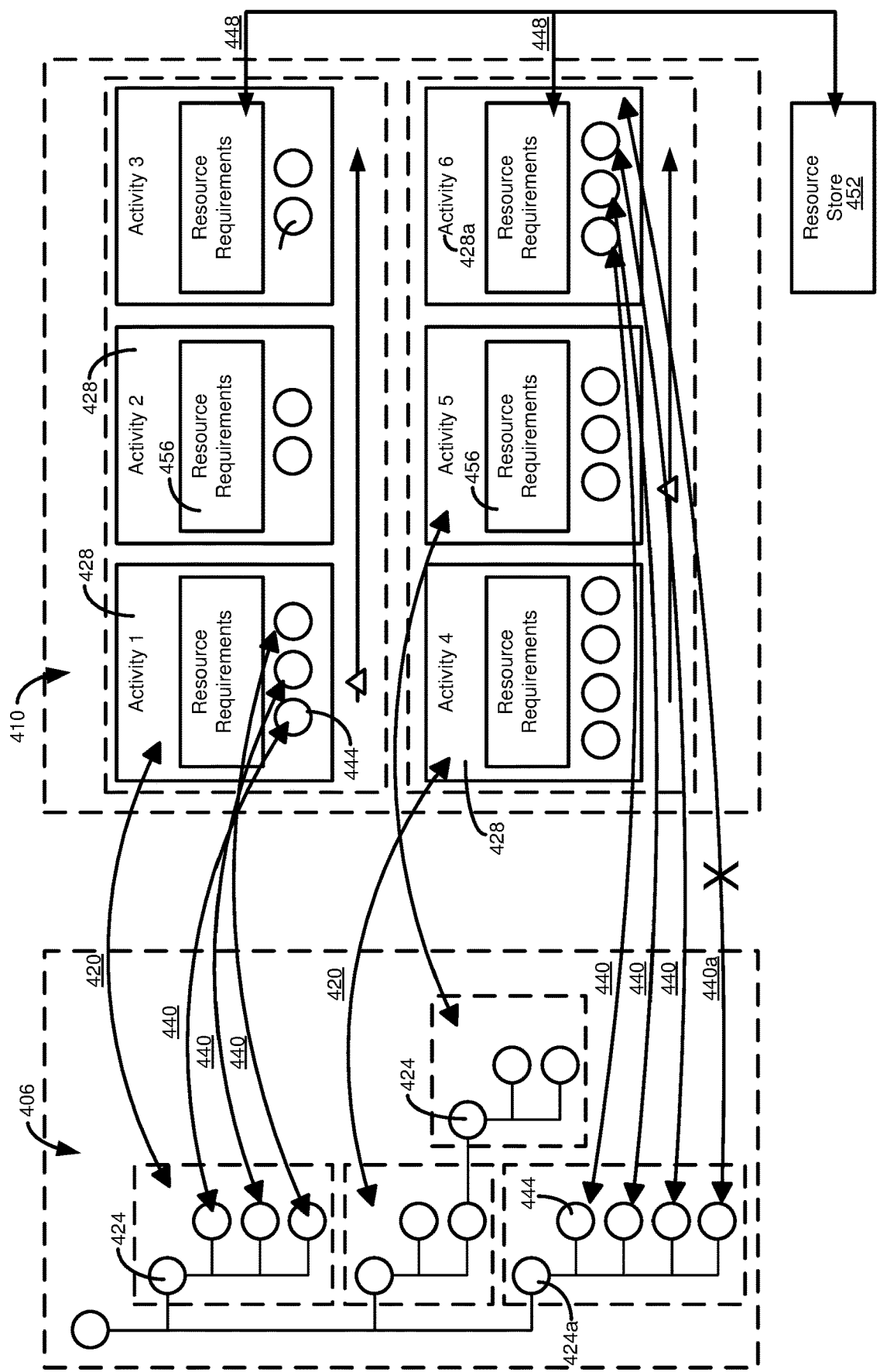
FIG. 4 is a schematic diagram illustrating consistency checks that can be conducted between collection object instances and activity object instances.

FIG. 4 illustrates various checks, such as consistency checks that may be performed for a collection data structure 406 and an activity data structure 410. Checks 420 determine whether each collection instance 424 in the collection data structure 406 is associated with a corresponding activity instance 428 in the activity data structure 410. Checks 440 determine whether, for given activity instances 428, the activity instance includes all of the components 444 from the corresponding collection instance 424. Note that test 440a is indicated as having failed, as a component instance 440 that is present in the collection instance 424a is not present in the activity instance 428a.

Checks 448 determines whether a resource store 452 indicates that sufficient resources exist to process activity instances 428 at their scheduled times, given resource requirement 456 for the activity instances, including whether sufficient resources exist to process multiple activity instances that are scheduled for at least partially concurrent processing.

Example 6—Example Scheduling of Activity Instances

As described in Example 2, disclosed technologies can include functionality for generating activity instances based on collection instances in a collection data structure. These activity instances may have some data automatically populated into the instance, such as an identifier of the corresponding collection instance and information, such as identifiers, for components associated with the activity instance. However, other data associated with an activity instance, such as scheduling, sequence, time available or time required, dependency information, or priority information, may need to be added to the activity instance after it is automatically instantiated. For example, a user may need to manually provide values for these elements. At least some of the values may be provided by arranging representations of activity instances on a graphical user interface, such as relative to a timeline or relative to representations of other activity instances, or by connecting activity instance representations to represent ordering or dependencies.

Figure 5:
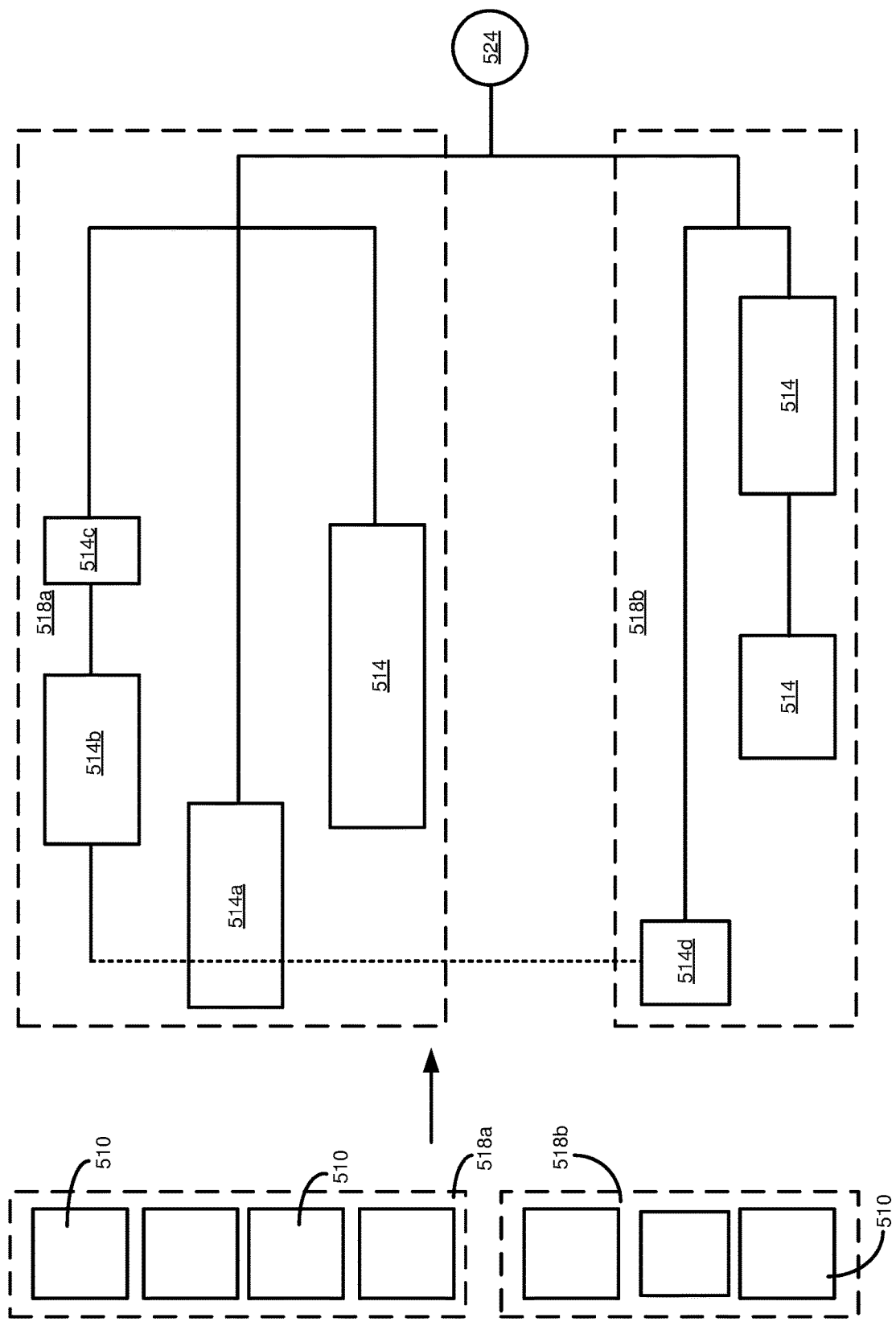
FIG. 5 is a schematic diagram illustrating how activity object instances can be scheduled relative to one another.

FIG. 5 illustrates how a plurality of unsequenced activity instances 510 can be sequenced to provide sequenced activity instances 514, such as using a graphical user interface. The unsequenced activity instances 510 are shown grouped by networks 518 (shown as 518a, 518b). A network 518 can provide a way of separately tracking groups of activities instances (whether sequenced or unsequenced), including tracking resources used in executing sub-processes represented by the networks.

Sequenced activity instances 514 within a given network 518 can be scheduled for concurrent processing, serial processing, or a combination thereof. When sequenced activity instances 514 are sequenced for concurrent processing, the processing can be partially concurrent. For example, in network 518a sequenced activity instance 514a starts processing before activity instance 514b, but the final portion of processing instance 514a occurs concurrently with the start of processing activity instance 514b.

In a similar manner, sequenced activity instances 514 between networks 518 can be carried out concurrently or sequentially. Sequenced activity instance 514c of network 518a is not processed concurrently with any activity instance in network 518b. However, activity instance 514a of network 518a is processed concurrently with activity instance 514d of network 518b.

FIG. 5 also illustrates how sequenced activity instances 514 can be related between networks 518. Activity instance 514d is shown as having a parent dependency with activity instance 514b. That is, activity instance 514d should be completed before activity instance 514b begins processing. FIG. 5 further illustrates that the processing results of multiple networks 518 can be combined to provide an output 524. That is, output 524 can be provided when both network 518a and network 518b have been completed, but not when less than both networks have been completed.

Example 7—Example Request Generation from Activity Data Structures

Figure 6:
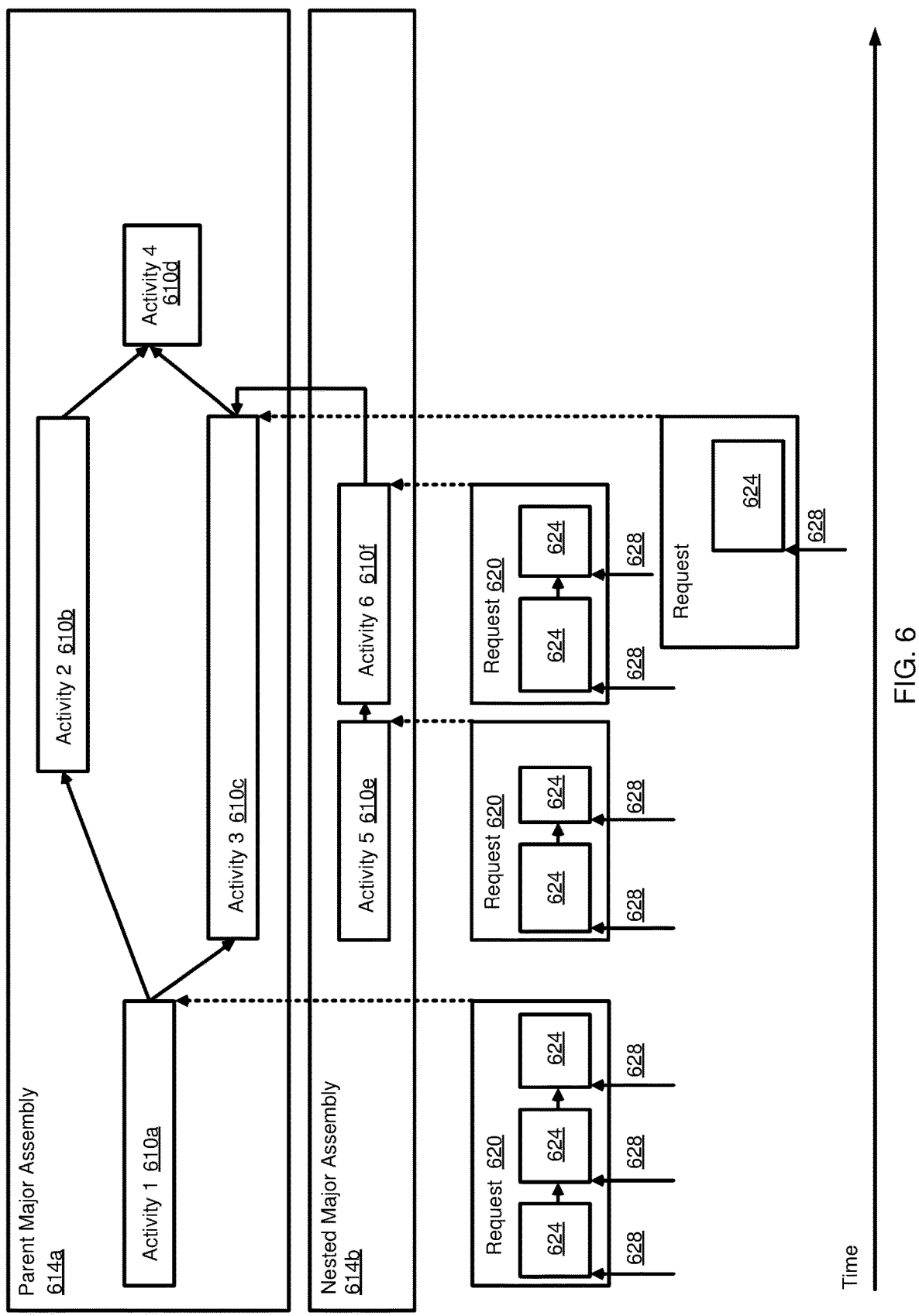
FIG. 6 is a diagram illustrating how activity object instances can be organized into networks, and can be associated with requests.

FIG. 6 provides another example of how activity instances 610 can be scheduled relative to one another, and can be organized into different networks 614 (shown as networks 614a, 614b), where two or more networks can be related to one another. FIG. 6, in some cases, can be implemented as a GUI screen, were representations for activity instances 610 can be manipulated, such as by dragging and dropping them and adding, removing, and altering links between activity instances.

In the network 614a, activity instances 610b, 610c, 610d are shown as being scheduled sequentially after activity instance 610a. Activity instances 610b, 610c are shown being carried out partially in parallel, with both activity instances being completed prior to the scheduling of activity instance 610d, which requires completion of those two activity instances prior to its initiation.

In network 614b, activity instance 610f is shown as scheduled sequentially after activity instance 610e. Network 614b is nested with respect to network 614a, as completion of activity instance 610f is a condition for initiating activity instance 610d. For example, network 614b can produce a component or other input that is required for activity instance 610d, or the correct processing sequence may simply dictate that activity instance 610f be completed before activity instance 610d can begin.

The activity instances 610 may be used to issue requests 620 that will cause the activities to be executed. For example, in a production process, the requests 620 can be production orders that can be issued to various individuals, departments, machines, etc. to carry out tasks or instructions 624 associated with the activity. Each instruction 624 can be associated with one or more inputs 628, where the inputs can be component instances.

Example 8—Example User Interface Screen for Executing Consistency Checks

Figure 7:
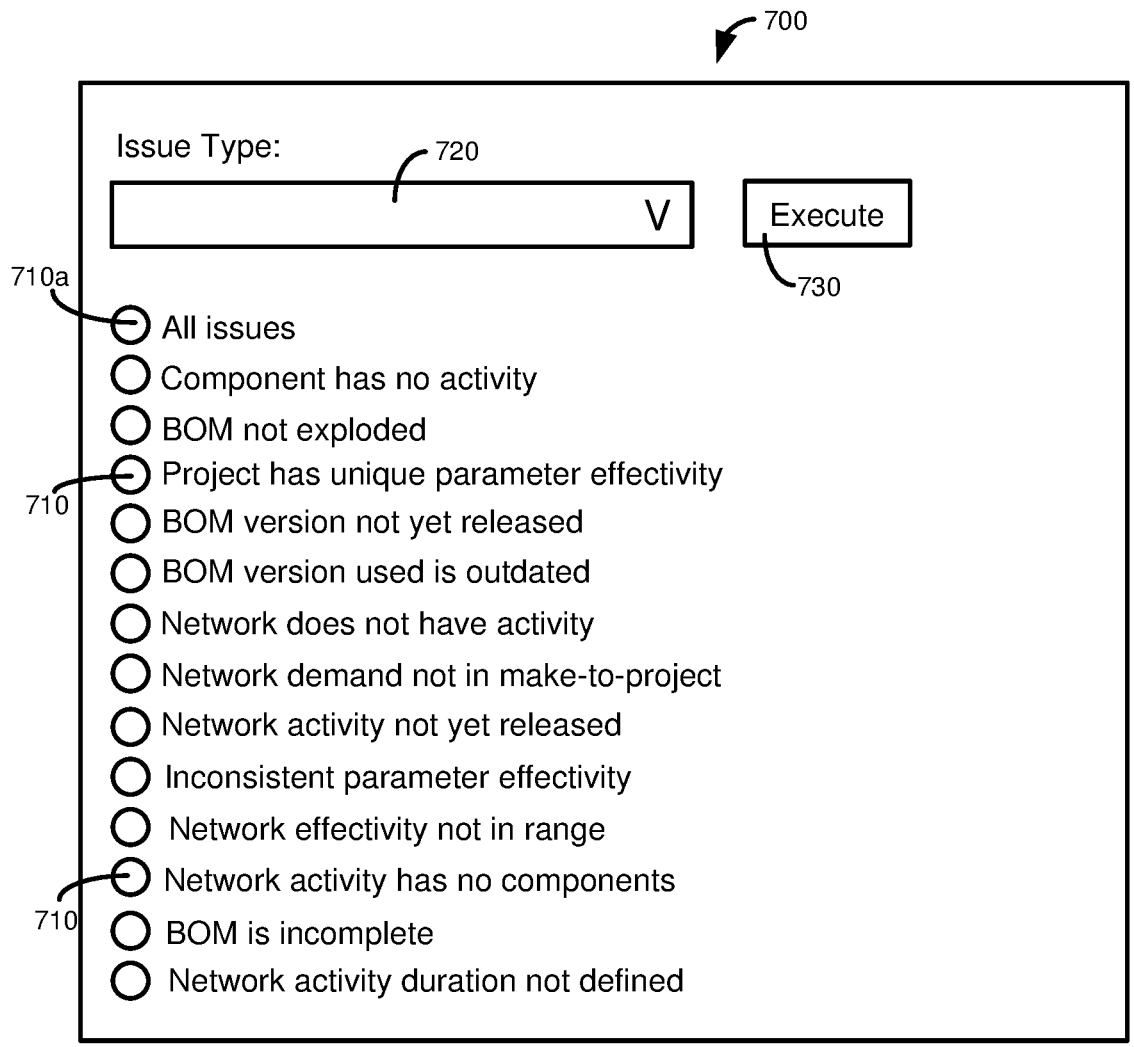
FIG. 7 is an example graphical user interface screen allowing a user to select and execute consistency checks.

In some cases, consistency checks can be carried out automatically at various stages of project definition or execution. In other cases, a user can select to manually execute one or more consistency checks. FIG. 7 is an example user interface screen 700 that allows a user to select and execute one or more consistency checks.

The user interface screen 700 displays user interface controls 710, such as radio buttons or selection boxes, for a plurality of consistency checks. Consistency check 710a represents a selection of all other consistency checks 710, while the other consistency checks are single checks. However, selection of consistency checks may be implemented in another manner. For example, the user interface screen 700 can present categories of consistency checks, where at least some of the categories include multiple consistency checks.

Consistency checks selected via the user interface controls 710 can be added to a query of a query field 720. Once the user is satisfied with the query, the query can be executed by selecting user interface control 730.

Example 9—Example Implementations of Consistency Checks

Figure 8:
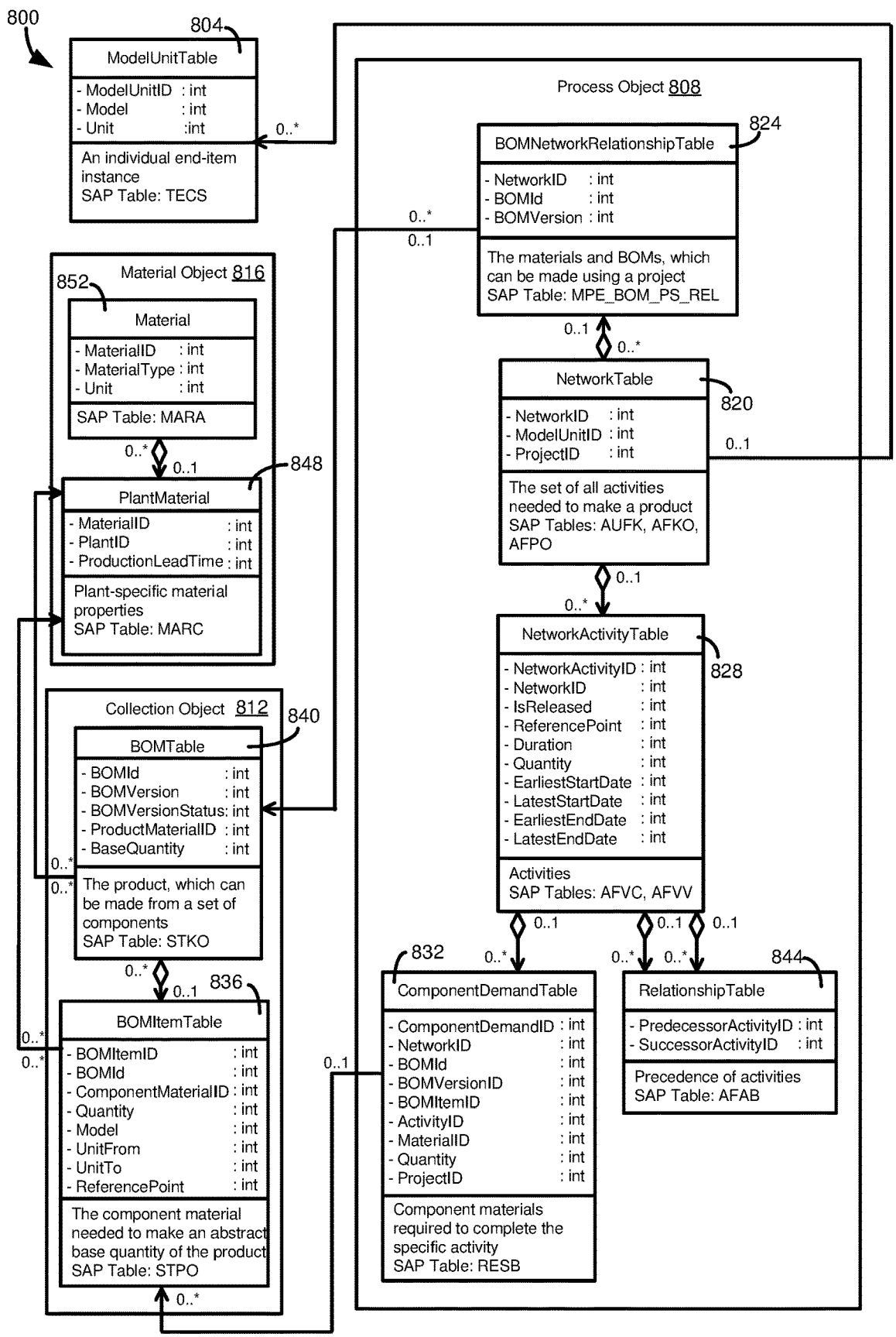
FIG. 8 is an example data model that can be used to relate material object instances, activity object instances, and collection object instances.

FIG. 8 illustrates a data model 800 that can be used in a particular application of disclosed technologies. The data model 800 illustrates how an end item, represented by ModelUnitTable 804, can relate to tables in a process object 808, a collection object 812 (which can represent a plurality of collection object instances), and a material object 816. In particular, the end item can be produced by an overall process represented by the process object 808, which is associated with a network table 820 that describes networks (e.g., sub-processes) in the overall process. The network table 820 can reference particular collection objects 812 (for example, a bill of materials for a given network) using a relationship table 824.

Each network in the network table 820 can be associated with activities (e.g., activity object instances) in a network activity table 828. Activities in the network activity table 828 can be related to components (e.g., inputs), such as components in a collection object instance (e.g., a bill of materials) through a component demand table 832. The component demand table 832 can reference a bill of materials item table 836, which in turn can reference bill of materials in a bill of materials table 840. A relationship table 844 can be used to determine predecessor activities and successor activities for a network activity in the network activity table 828.

The bill of materials item table 836 and the bill of materials table 840 can reference a plant material table 848 associated with a material object 816. The plant material table 848 can reference a material table 852, also part of the material object 816.

FIGS. 9A-9U present pseudocode for a program that calls various consistency checks, and pseudocode for the called consistency checks, as well as for other methods that can be useful in conducting consistency checks, or presenting the results of consistency checks. The pseudocode associated with FIGS. 9A-9U can use the data model 800 of FIG. 8.

FIGS. 9A and 9B represent a primary program 900 that includes code 906 for determining whether parameter effectivity exists (that is, for a particular output or end-item unit, whether required type or conditional information has been provided). In some cases, if parameter effectivity does not exist, neither a collection data structure nor an activity data structure can be created. Accordingly, internal consistency of the activity data structure cannot be checked, nor can the activity data structure be compared with the corresponding collection data structure. The pseudocode, and the disclosed technologies in general, can be implemented, in a specific example, the SAP S/4 HANA MANUFACTURING FOR PRODUCTION ENGINEERING AND OPERATIONS product, and other products, available from SAP SE, of Walldorf, Germany.

Code 908 defines a consistency check to determine whether an activity data structure with appropriate networks has been defined for a given collection data structure. The test fails if at least one required network is not identified. Assuming both a collection data structure and required networks for the activity data structure exist, the program 900 can carry out additional checks. For example, code 910 determines whether the current user is authorized to access the networks used in the activity data structure. Turning to FIG. 9B, code 912 checks to see if all networks in an activity data structure have activities corresponding to instances of collection data objects in a collection data structure. In FIGS. 9A and 9B, code 914 calls additional consistency tests for which separate methods are provided, and which are described in conjunction with FIGS. 9C-9O. At the end of the program 900, code 916 returns issues that have been identified through the various checks performed by the program 900.

In FIG. 9C, code 920 defines a consistency check to determine if multiple networks in an activity data structure include the same parameters, thus inhibiting the ability to distinguish between networks, such as to define completion of an end item with respect to networks of activity object instances. In addition, when a collection data structure is read to produce or evaluate an activity data structure ("exploding" the collection data structure), errors may result, as a program may not "know" to which network a particular collection instance should correspond.

In FIG. 9D, code 922 defines a consistency check to determine whether a version of a collection data structure used to produce an activity data structure corresponds to a current version. If the version of the collection data structure used for the activity data structure is out of date, components, collections, and relationships between collections may be out of date. If the version of the collection data structure is more recent than the version used for the activity data structure, the current version of the collection data structure can be "exploded" to produce an updated activity data structure.

In FIG. 9E, code 924 checks to see if a version of a collection data structure specified for use with an activity data structure has been released, such as being approved to begin processing. In FIG. 9F, code 926 checks to see if activity instances have been released, such as being approved to begin processing. An activity might not be released, for example, when an activity instance has been created, but not all values were not provided for all required attributes. An activity might not be marked as released if the activity has not yet been assigned a schedule/sequence in a process.

In FIG. 9G, code 928 checks to see whether typing or conditional information associated with a collection instance matches typing or conditional information associated with a corresponding activity instance. A mismatch can indicate that a collection instance or an activity instance was inadvertently associated with the wrong activity data structure or collection data structure, respectively.

In FIG. 9H, code 930 checks to see that collection instances include required information used to help schedule a corresponding activity instance in an activity data structure. In FIG. 9I, code 932 checks to make sure that major assemblies in a production process only include collection instances. That is, for example, typically a component would not be directly assigned to a major assembly, but would rather be incorporated into a collection instance, even if that collection instance only included a single component.

Typically, activity instances include placeholders for components to be assigned to the activity instance. Code 934 of FIG. 9J determines if components have failed to be assigned to one of these placeholders. Code 936 of FIG. 9K determines if components assigned to a collection instance match components assigned to the corresponding activity instance. In FIG. 9L, code 938 checks to make sure that every component of the collection data structure has a corresponding component in the activity data structure.

Consistency checks can be used to confirm that the scheduling of activity instances is appropriate. For example, in FIG. 9M, code 940 determines whether an activity duration set for an activity instance matches another representation of the activity instance, or collection instance on which the activity instance was based. For example, if a collection instance defines a component, a definition for the component may include a time needed to produce this component. If that time does not match a duration set in the corresponding activity instance, a mismatch can be identified. Code 942 of FIG. 9N determines if activities in an activity data structure are scheduled consistently. For example, the code 942 can check for issues such as an activity being scheduled to start before its predecessor has completed, or if an activity is scheduled to start before its predecessor activity.

As described in Example 7, networks can be nested. Code 944 of FIG. 9O determines if networks are nested, and, if so, checks to make sure that relationships between the networks are proper, taking into account, for example, precedence/sequence relationships.

FIG. 9P presents code 946 for identifying the last activity in a process. Code 948 of FIG. 9Q causes a collection data structure to be exploded. FIG. 9R provides code 950 for collecting and returning various types of consistency check violations. FIG. 9S provides code 952 for determining how long a process is scheduled to take based on the activity data collection. Code 954 of FIG. 9T outputs identified consistency check issues. FIG. 9U presents code 956 for determining if components (e.g., a material) are used in activities. An error can be raised if it is determined that components exist that are not used in an activity of a process.

Figure 10:
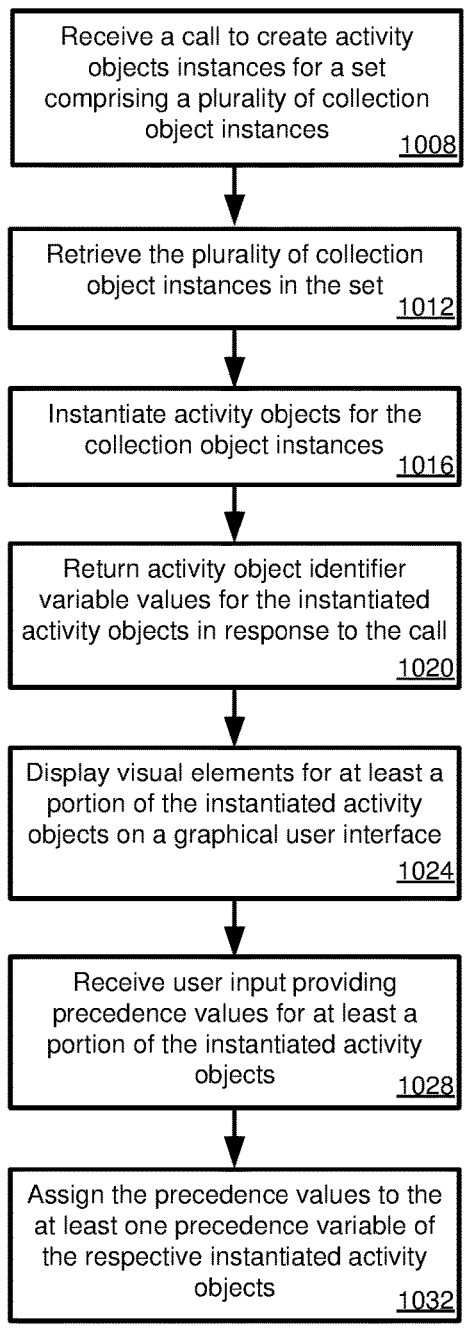
FIG. 10 is a flowchart of a method for generating activity object instances from collection object instances.

Example 10—Example Operations in Generating Activity Data Structure and Consistency Checking FIG. 10 illustrates a method 1000 for generating activity object instances corresponding to collection object instances. At 1008, a call is received to create activity object instance for a set comprising a plurality of collection object instances. The request includes an identifier of the set. The plurality of collection object instances in the set are retrieved at 1012. At least a portion of the collection object instances each specify a plurality of component object instances.

At 1016, activity objects are instantiated for the collection object instances. A given activity object instance includes an activity object identifier variable, one or more variables corresponding to component object identifiers for the one or more component object instances specified in a corresponding collection object instance, a sequence variable (e.g., an identifier for a position in a sequence, a time the activity object instance is to begin processing or end processing), at least one precedence variable, and a span variable (e.g., a duration or at least a portion of information useable to calculate or access a duration). The values of the activity object identifier variables for the instantiated activity objects are returned at 1020 in response to the call. At 1024, visual elements are displayed on a graphical user interface for at least a portion of the instantiated activity objects. User input is received at 1028, providing precedence vales for at least a portion of the instantiated activity objects. The precedence values are assigned to the at least one precedence variable of the respective instantiated activity objects at 1032.

Figure 11:
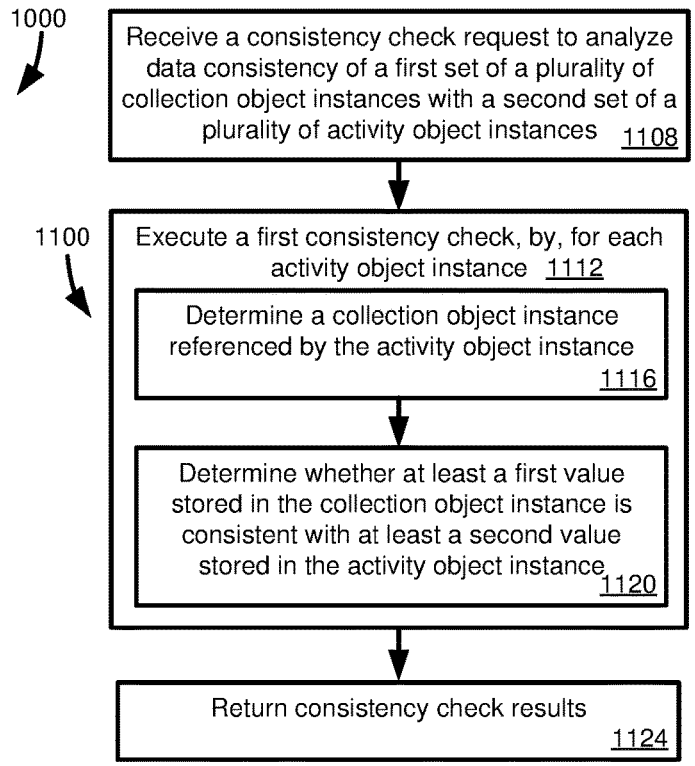
FIG. 11 is a flowchart of a method for conducting consistency checks between collection object instances and activity object instances.

FIG. 11 illustrates a method 1100 for determining consistency between activity object instances and collection object instances. At 1108, a consistency check request is received to analyze data consistency of a first set of a plurality of collection object instances with a second set of a plurality of activity object instances. A given collection object instance includes a third set of one or more identifiers for one or more component object instances and a given activity object instance includes a fourth set of one or more identifiers for one or more component object instances.

A first consistency check is executed at 1112 for activity objects instances of the plurality of activity object instances. The executing includes, at 1116, determining a collection object instance referenced by the activity object instance. The executing includes, at 1120, determining whether at least a first value stored in the collection object instance is consistent with at least a second value stored in the activity object instance. Consistency check results are returned at 1124.

Figure 12:
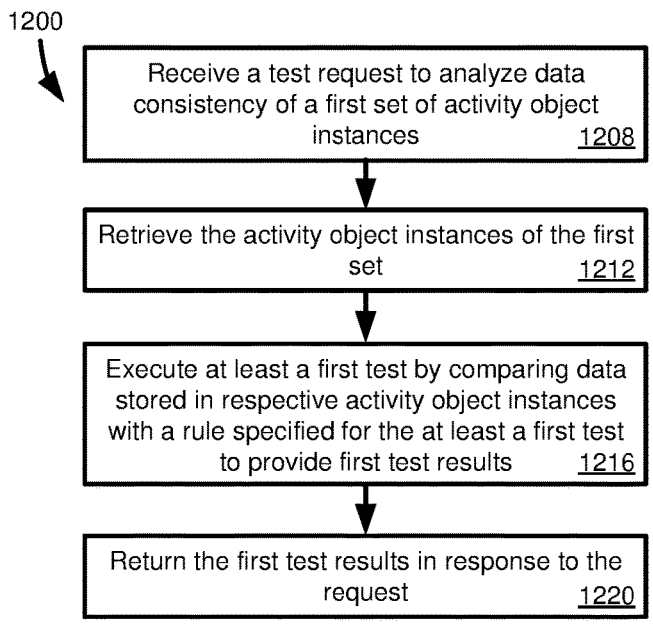
FIG. 12 is a flowchart of a method for conducting consistency checks with activity object instances.

FIG. 12 illustrates a method 1200 for executing consistency checks for a set of activity object instances. At 1208, a test request is received to analyze data consistency of a first set of activity object instances. A given activity object instance includes an activity object identifier variable, one or more component object instance identifier variables, a sequence variable, at least one precedence variable, and a span variable. Activity object instances of the first set are retrieved at 1212. At 1216, the at least a first test is executed by comparing data stored in respective activity object instances with a rule specified for the at least a first test to provide first test results. The first test results are returned in response to the check request at 1220.

Example 11—Computing Systems

Figure 13:
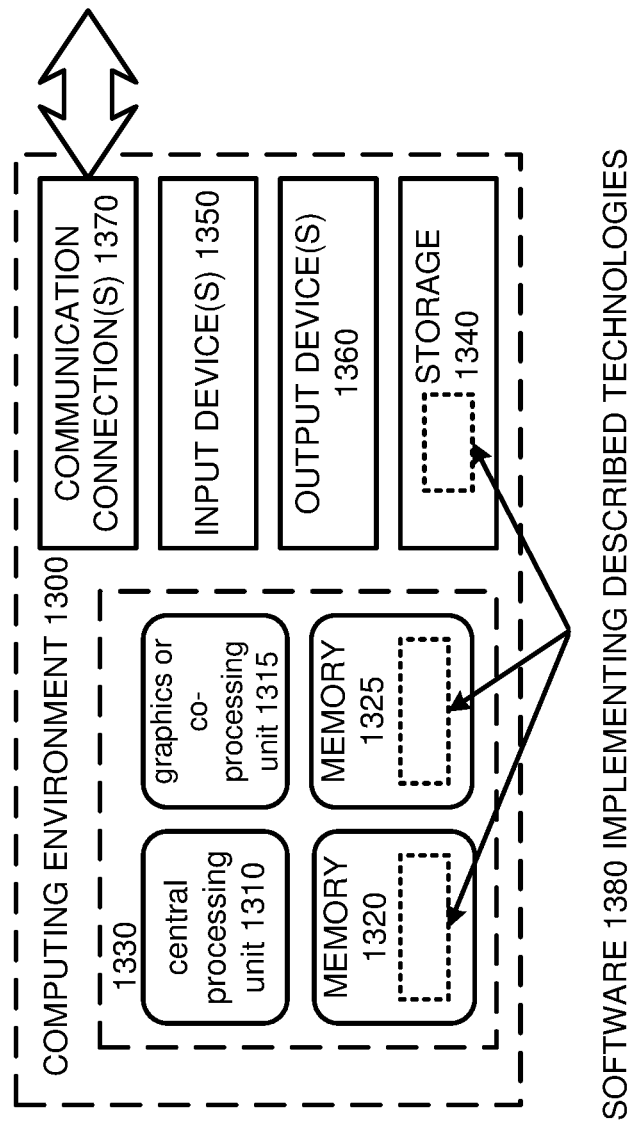
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing technologies describes in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315. The memory 1320, 1325, may also store database data.

A computing system 1300 may have additional features. For example, the computing system 1300 includes storage 1340 (such as for storing data of the data store 222), one or more input devices 1350, one or more output devices 1360, and one or more communication connections 1370, including input devices, output devices, and communication connections for interacting with a user, such as through the user interface screen 700 of FIG. 7. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 14:
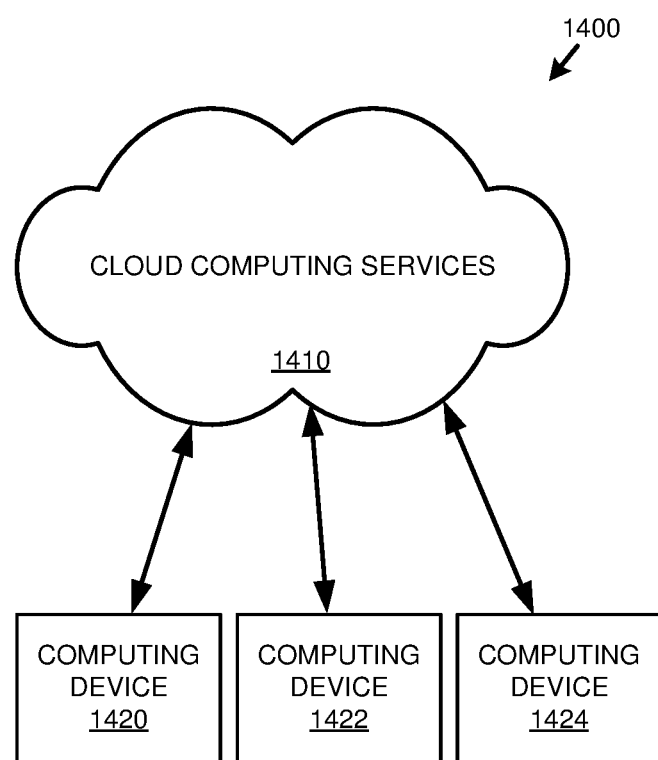
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable media comprising:
   computer-executable instructions that, when executed by a computing system comprising a memory and at least one hardware processor coupled to the memory, cause the computing system to receive a call to create activity object instances for a set comprising a plurality of collection object instances, the call comprising an identifier of the set;
   computer-executable instructions that, when executed by the computing system, cause the computing system to retrieve the plurality of collection object instances in the set, collection object instances of the plurality of collection object instances specifying one or more component object instances, at least a portion of the collection object instances each specifying a plurality of component object instances;
   computer-executable instructions that, when executed by the computing system, cause the computing system to instantiate activity object instances for the plurality of collection object instances, a given activity object instance of the activity object instances comprising:
      an activity object identifier variable;
      one or more variables corresponding to component object identifiers for the one or more component object instances specified in a corresponding collection object instance;
      a sequence variable, the sequence variable indicating when the given activity object instance of the activity object instances is to be performed relative to other activity object instances of the activity object instances;
      at least one precedence variable; and
      a span variable, the span variable indicating or useable to calculate a duration for the given activity object instance of the activity object instances;
   computer-executable instructions that, when executed by the computing system, cause the computing system to return values of activity object identifier variables for the activity object instances in response to the call;
   computer-executable instructions that, when executed by the computing system, cause the computing system to display visual elements for at least a portion of the activity object instances on a graphical user interface;
   computer-executable instructions that, when executed by the computing system, cause the computing system to receive user input providing precedence values for at least a portion of the activity object instances; and
   computer-executable instructions that, when executed by the computing system, cause the computing system to assign the precedence values to the at least one precedence variable of the at least a portion of the activity instances to provide precedence information for the activity object instances.

2. The one or more non-transitory computer-readable media of claim 1, further comprising:
   computer-executable instructions that, when executed by the computing system, cause the computing system to update the graphical user interface to display the visual elements for the at least a portion of the activity object instances in a sequence defined at least in part by the precedence values.

3. The one or more non-transitory computer-readable media of claim 1, wherein the at least one precedence variable identifies an activity object instance of the activity object instances that is to be completed before processing of an activity object instance of the activity object instances having the precedence variable is to begin.

4. The one or more non-transitory computer-readable media of claim 1, wherein the sequence variable comprises an indicator of a time when a given activity object instance of the activity object instances is to begin processing.

5. The one or more non-transitory computer-readable media of claim 1, wherein the given activity object instance further comprises one or more identifiers for one or more processing resources used to process the given activity object instance.

6. The one or more non-transitory computer-readable media of claim 1, wherein the given activity object instance comprises an identifier of a corresponding collection object instance.

7. The one or more non-transitory computer-readable media of claim 1, further comprising:
   computer-executable instructions that, when executed by the computing system, cause the computing system to receiver a request to execute one or more consistency checks between the collection object instances and the activity object instances.

8. The one or more non-transitory computer-readable media of claim 1, further comprising: computer-executable instructions that, when executed by the computing system, cause the computing system to receive a request to execute one or more consistency checks between the activity object instances.

9. A computing system comprising:
   at least one memory;
   one or more processing units coupled to the at least one memory; and
   one or more non-transitory computer readable storage media storing instructions that, when executed, cause the computing system to perform operations comprising:
      receiving a consistency check request to analyze data consistency of a first set comprising a plurality of collection object instances, wherein collection object instances of the plurality of collection object instances comprise a collection identifier and one or more component identifiers, with a second set comprising a plurality of activity object instances, wherein activity object instances of the plurality of activity object instances comprise (i) a collection identifier identifying a collection object instance of the plurality of collection object instances, (ii) one or more component identifiers, (iii) a first data member indicating when an activity associated with the activity object instance is to commence, and (iv) a second data member useable to indicate when the activity is to be completed;
      executing the consistency check, the executing comprising, for the plurality of activity object instances of the second set:
         determining (i) whether the one or more component identifiers of a given activity object instance in the second set are equal to the one or more component identifiers of the collection object instance in the first set referenced by the given activity object instance; (ii) whether each of the collection object instances in the first set is associated with a corresponding activity object instance in the second set; or (iii) whether each of the activity object instances in the second set is associated with a corresponding collection object instance hi the first set;

determining an internal consistency of the plurality of activity object instances based on the first data member and the second data member in each of the activity object instances; and returning results of the consistency check.

10. The computing system of claim 9, wherein executing the consistency check comprises: determining whether the collection object instances of the plurality of collection object instances are associated with a corresponding activity object instance.

11. The computing system of claim 9, wherein executing the consistency check comprises: determining whether the activity object instances of the plurality of activity object instances are associated with a corresponding collection object instance.

12. The computing system of claim 9, wherein executing the consistency check comprises:

determining whether a first version identifier specified for the first set matches a collection object set version identifier specified for the second set.

13. The computing system of claim 9, wherein executing the consistency check comprises executing at least two of the determining (i)-(iii).

14. A method, implemented by a computing device comprising at least one memory and at least one processor coupled to the at least one memory, comprising:

receiving a test request to analyze data consistency of a first set of activity object instances, wherein a given activity object instance of the first set comprises:

an activity object identifier variable;

one or more variables corresponding to component identifiers for one or more components specified in at least one collection object instance;

a sequence variable, the sequence variable indicating when the given activity object instance of the first set of activity object instances is to be performed relative to other activity object instances of the first set of activity object instances;

at least one precedence variable; and a span variable, the span variable indicating or useable to calculate a duration for the given activity object instance;

retrieving the activity object instances of the first set;

executing at least a first test by comparing data stored in the retrieved activity object instances with a rule specified for the at least a first test to provide first test results, the at least a first test comprising (i) determining whether components associated with component identifiers of a particular activity object instance of the first set are scheduled to be available when the particular activity object instance is scheduled to commence; (ii) determining that the activity object instance depends on a parent activity object instance and whether the parent activity object instance is scheduled to complete before the particular activity object instance is to commence; (iii) determining if the span variable of the given activity object instance is zero; (iv) determining if the particular activity object instance references the at least one collection object instance; or (v) determining if the particular activity object instance references a corresponding activity object instance of a second set of activity object instances; and returning the first test results in response to the test request.

15. The method of claim 14, wherein the at least a first test comprises determining whether components associated with component identifiers of an activity object instance are scheduled to be available when the particular activity object instance is scheduled to commence.

16. The method of claim 14, wherein the at least a first test comprises determining that the particular activity object instance depends on a parent activity object instance and whether the parent activity object instance is scheduled to complete before the particular activity object instance is to commence.

17. The method of claim 14, wherein the at least a first test comprises determining if the span variable of the given activity object instance is zero.

18. The method of claim 14, wherein the at least a first test comprises determining if the particular activity object instance references at least one collection object instance.

19. The method of claim 14, wherein the at least a first test comprises determining if the particular activity object instance references a corresponding activity object instance of a second set of activity object instances.

20. The method of claim 14, wherein the at least a first test comprises at least two of the (i)-(v) comprised in the at least a first test.

* * * * *